United States Patent
Li et al.

(10) Patent No.: US 9,525,991 B2
(45) Date of Patent: *Dec. 20, 2016

(54) SYSTEMS AND METHODS FOR SHARING DIGITAL INFORMATION BETWEEN MOBILE DEVICES OF FRIENDS AND FAMILY USING EMBEDDED DEVICES

(71) Applicant: ACTIONTEC ELECTRONICS, INC., Sunnyvale, CA (US)

(72) Inventors: Chuang Li, Saratoga, CA (US); Bo Xiong, San Ramon, CA (US); Tsung-Yen Dean Chang, Los Altos Hills, CA (US)

(73) Assignee: ACTIONTEC ELECTRONICS, INC., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,719

(22) Filed: Jun. 25, 2013

(65) Prior Publication Data

US 2014/0376452 A1    Dec. 25, 2014

(51) Int. Cl.
*H04W 4/00* (2009.01)
*H04W 4/20* (2009.01)
*H04L 29/08* (2006.01)

(52) U.S. Cl.
CPC .............. *H04W 4/206* (2013.01); *H04L 67/26* (2013.01); *H04W 4/001* (2013.01)

(58) Field of Classification Search
CPC .................................................. H04W 80/04

(Continued)

(56) References Cited

U.S. PATENT DOCUMENTS 8,196,181 B2    6/2012  Devonshire et al.
8,214,537 B2 *  7/2012  Miura ........................... 709/252
(Continued)

FOREIGN PATENT DOCUMENTS

EP    1 881 678 A1    1/2008
EP    2 530 907 A1   12/2012
(Continued)

OTHER PUBLICATIONS

International Search Report & Written Opinion dated Jan. 12, 2015 in Int'l PCT Patent Appl No. PCT/US2014/043219.
(Continued)

*Primary Examiner* — Samina Choudhry
(74) *Attorney, Agent, or Firm* — Foley & Lardner LLP; Nicola A. Pisano; Robert D. Ward

(57) ABSTRACT

A method is provided for sharing digital information between first and second mobile devices. The method may include, at an embedded device, receiving the digital information from the first mobile device; at the embedded device, notifying the second mobile device of the digital information via a push notification; and at the embedded device, maintaining communication with the first and second mobile devices. In some embodiments, the method further includes, at the embedded device, receiving an embedded device wide area network (WAN) Internet protocol (IP) address. Maintaining communication with the first and second mobile devices may include notifying the first and second mobile devices of the new embedded device WAN IP address via respective additional push notifications, or using a DDNS server.

30 Claims, 20 Drawing Sheets

(58) Field of Classification Search
USPC .......................................................... 370/328
See application file for complete search history.

(56) References Cited

U.S. PATENT DOCUMENTS

| | | | |
|---|---|---|---|
| 8,327,012 B1 | 12/2012 | Nguyen et al. | |
| 8,351,921 B2 | 1/2013 | Bell et al. | |
| 8,356,346 B2 | 1/2013 | Datta et al. | |
| 8,407,776 B2 | 3/2013 | Somani et al. | |
| 8,412,772 B1 | 4/2013 | Nguyen et al. | |
| 8,423,058 B2 | 4/2013 | Mathias et al. | |
| 8,443,071 B2 | 5/2013 | Lu et al. | |
| 2002/0083342 A1 | 6/2002 | Webb et al. | |
| 2004/0068516 A1 | 4/2004 | Lee et al. | |
| 2004/0088731 A1 | 5/2004 | Putterman et al. | |
| 2004/0260801 A1 | 12/2004 | Li | |
| 2005/0014531 A1 | 1/2005 | Findikli | |
| 2006/0047843 A1 | 3/2006 | Julia et al. | |
| 2006/0236386 A1 | 10/2006 | Popkin | |
| 2007/0049258 A1 | 3/2007 | Thibeault | |
| 2007/0150558 A1 | 6/2007 | Teodosiu et al. | |
| 2008/0091763 A1 | 4/2008 | Devonshire et al. | |
| 2008/0134316 A1 | 6/2008 | Devonshire et al. | |
| 2009/0282127 A1 | 11/2009 | Leblanc et al. | |
| 2010/0064130 A1 | 3/2010 | Borisov | |
| 2010/0250867 A1 | 9/2010 | Bettger et al. | |
| 2011/0252238 A1* | 10/2011 | Abuan | H04L 61/2575 713/168 |
| 2011/0264883 A1 | 10/2011 | Desplanques et al. | |
| 2011/0277028 A1 | 11/2011 | Piazza et al. | |
| 2012/0030751 A1 | 2/2012 | Datta et al. | |
| 2012/0059924 A1 | 3/2012 | Zhang et al. | |
| 2012/0072731 A1 | 3/2012 | Winograd et al. | |
| 2012/0203862 A1 | 8/2012 | Tayeb et al. | |
| 2012/0231777 A1* | 9/2012 | Lewis et al. | 455/418 |
| 2012/0254917 A1 | 10/2012 | Burkitt et al. | |
| 2012/0307656 A1 | 12/2012 | Vyrros et al. | |
| 2012/0324094 A1 | 12/2012 | Wyatt et al. | |
| 2013/0024233 A1 | 1/2013 | Aaron et al. | |
| 2013/0031155 A1 | 1/2013 | Terrano et al. | |
| 2013/0045729 A1 | 2/2013 | Haik et al. | |
| 2013/0067550 A1 | 3/2013 | Chen et al. | |
| 2013/0086245 A1 | 4/2013 | Lu et al. | |
| 2013/0091557 A1 | 4/2013 | Gurrapu | |
| 2013/0103844 A1 | 4/2013 | Bulut et al. | |
| 2013/0132573 A1* | 5/2013 | Lindblom | 709/225 |
| 2013/0132854 A1* | 5/2013 | Raleigh | 715/738 |
| 2013/0198788 A1 | 8/2013 | Barger et al. | |
| 2013/0254897 A1* | 9/2013 | Reedy et al. | 726/26 |
| 2014/0068023 A1* | 3/2014 | Arickan | 709/220 |
| 2014/0109174 A1 | 4/2014 | Barton et al. | |

FOREIGN PATENT DOCUMENTS

| | | |
|---|---|---|
| EP | 2 541 877 A1 | 1/2013 |
| WO | WO-2012/173541 A1 | 12/2012 |

OTHER PUBLICATIONS

PCT Communication Relating to the Results of the Partial International Search dated Oct. 7, 2014 in related Int'l PCT Patent Application No. PCT/US2014/043219.

* cited by examiner

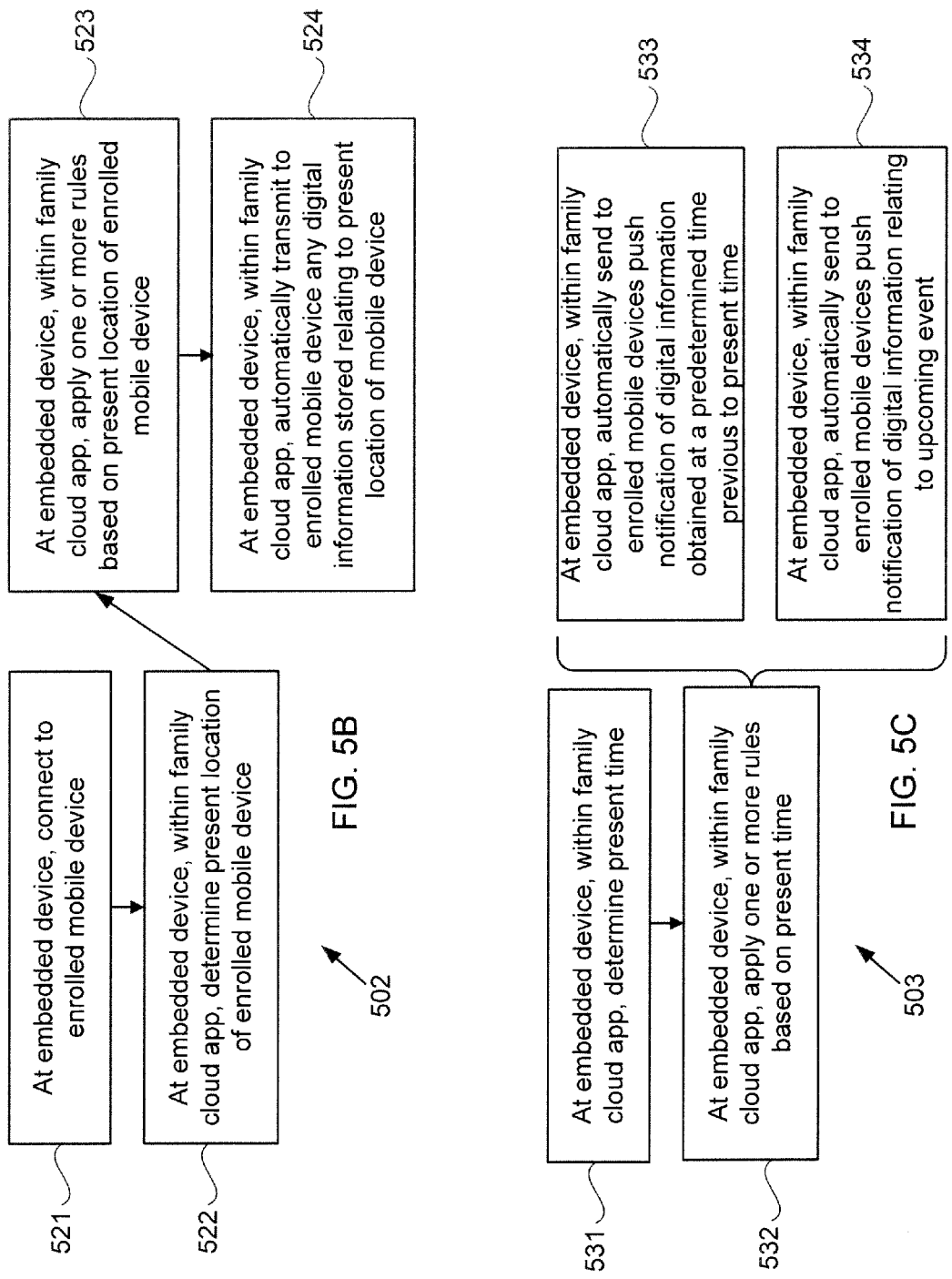

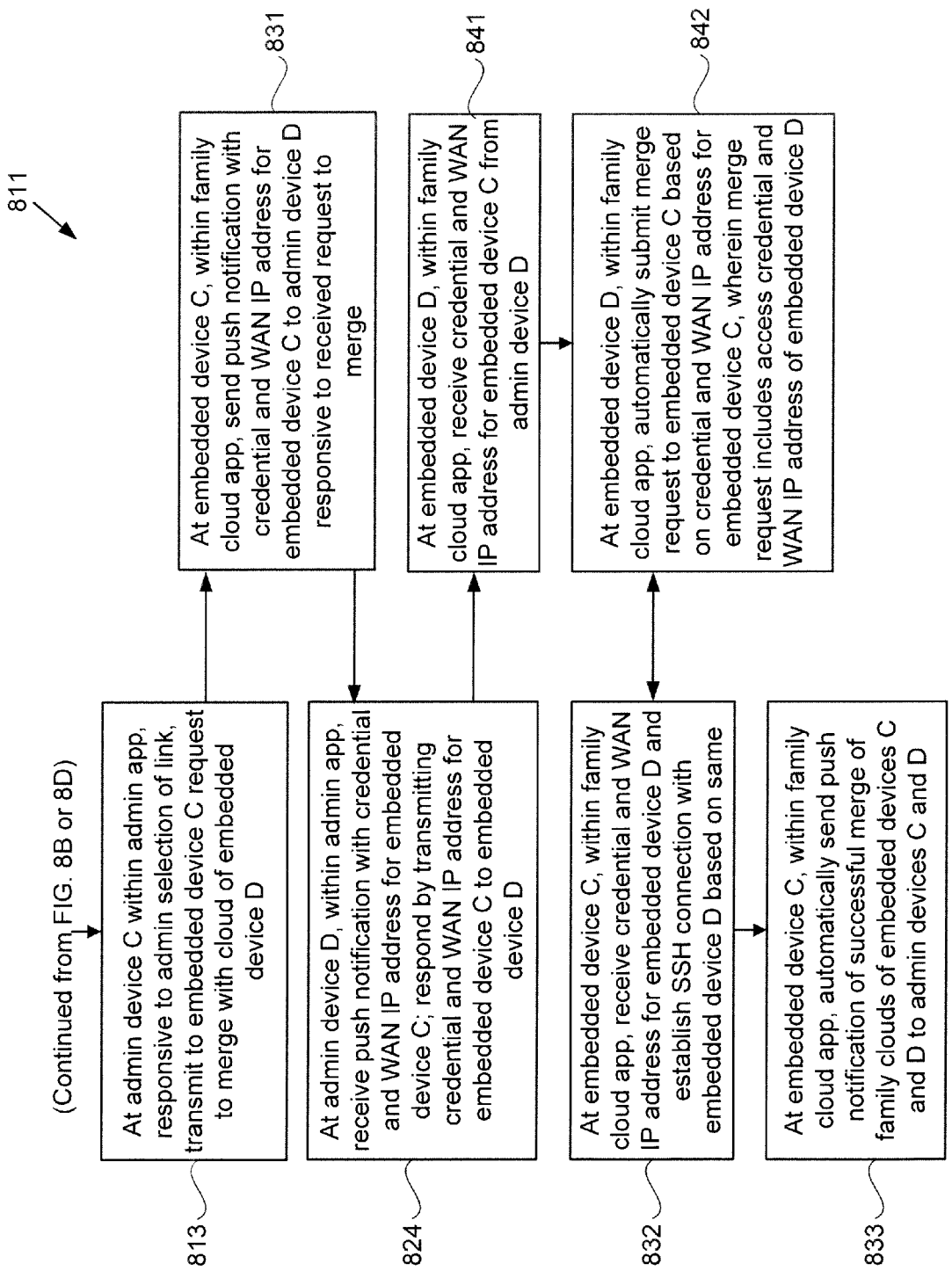

SYSTEMS AND METHODS FOR SHARING DIGITAL INFORMATION BETWEEN MOBILE DEVICES OF FRIENDS AND FAMILY USING EMBEDDED DEVICES

CROSS-REFERENCE TO RELATED APPLICATIONS

This application is related to the following applications that are being filed on even date herewith, the entire contents of each of which are incorporated by reference herein:

U.S. patent application Ser. No. 13/926,758, entitled "SYSTEMS AND METHODS FOR SHARING DIGITAL INFORMATION BETWEEN MOBILE DEVICES OF FRIENDS AND FAMILY USING MULTIPLE LAN-BASED EMBEDDED DEVICES;" and U.S. patent application Ser. No. 13/926,784, entitled "SYSTEMS AND METHODS FOR SHARING DIGITAL INFORMATION BETWEEN MOBILE DEVICES OF FRIENDS AND FAMILY BY LOADING APPLICATION COMPONENTS ONTO EMBEDDED DEVICES."

FIELD

This application relates to sharing digital information between mobile devices.

BACKGROUND

Devices may use a variety of wireless protocols to communicate with one another, such as IEEE 801.11 (Wi-Fi) or Bluetooth. For example, a wireless gateway may be wirelessly connected to mobile devices such as smartphones, tablet computers, laptop computers, and the like, and may provide a connection between such devices and the Internet or other wired network to which the wireless gateway is connected. But depending on the particular devices, a user may need to have a certain amount of technical expertise to initially establish a connection between the devices. For example, a wireless gateway using IEEE 802.11 may be assigned one or more extended service set identifiers, or ESSIDs (sometimes referred to as SSIDs), each of which may be a sequence of numbers or letters that identifies that wireless gateway to other devices, preferably uniquely. The wireless gateway may broadcast one or more of its ESSIDs so as to alert other devices to the wireless gateway's presence on the network. The wireless gateway also may have one or more access credentials, such as a login and password, or an encryption key, which may be associated with a particular one of the ESSIDs. The wireless gateway may be programmed to permit devices to connect that (1) transmit the proper ESSID to the wireless gateway, and (2) transmit the proper credential to the wireless gateway. Technically savvy users within Wi-Fi range readily may be able to obtain the ESSID of a wireless gateway and the proper credential, and to suitably configure a mobile device to wirelessly transmit that ESSID and credential to the wireless gateway so as to connect to the wireless gateway. But users outside of the wireless gateway's Wi-Fi range may lack sufficient technical savvy to connect their mobile device to the gateway via the Internet using the gateway's wide area network (WAN) internet protocol (IP) address, and even if they could connect to the gateway they may not be able to communicate meaningfully with it.

Moreover, different mobile devices connected to a given wireless gateway may not be able to share information readily with one another. A technically savvy user may be able to set up a local media server based on Windows™ Media Player (Microsoft Corporation, Redmond Wash.), or the Home Sharing feature within iTunes™ (Apple Inc., Cupertino Calif.), or other commercially available software on a personal computer that is connected to the wireless gateway. Mobile devices that are directly connected to the gateway via Wi-Fi and having the proper software thereon then may access digital media, such as photographs or videos, stored on the local media server. But devices that are not directly connected to the wireless gateway may not access the digital media. So-called "cloud" based services also are commercially available that permit mobile devices to share digital media over the Internet, typically providing a fixed amount of storage space, sometimes in exchange for a fee. For example, iCloud™ (Apple Inc., Cupertino Calif.) is a service that stores a user's digital media such as music, photos, apps, documents, books, mail, notes, reminders, contacts, and calendars on a remote server. The remote server then pushes such media to any of the user's enrolled mobile devices over Wi-Fi or over a cellular data network such as 3G or 4G, without the need to connect to a particular gateway or local computer.

Certain aspects of cloud based services such as iCloud™ may limit their usefulness to certain users, and thus may limit their adoption. For example, because a cloud based service may store the personal information of millions of users within a central or distributed database, some users may be concerned about the privacy of their information. Moreover, such a database may represent a particularly appealing target for hackers, because of the potential to access the information of so many users simultaneously. Additionally, the amount of storage space available to the user typically is fixed and relatively low, with additional increments of storage space available at an increasing cost. For example, the iCloud™ service presently provides the user with 5 GB of free storage, and charges a fee for additional storage. The cloud based service also may limit the types of information that the user may store.

Thus, what is needed is a system and method to facilitate the sharing of digital information between mobile devices.

SUMMARY

Embodiments of the present invention provide embedded devices for establishing wireless clouds for sharing digital information between mobile devices of friends and family.

Under one aspect of the present invention, a method is provided for sharing digital information between first and second mobile devices. The method may include, at an embedded device, receiving the digital information from the first mobile device; at the embedded device, notifying the second mobile device of the digital information via a push notification; and at the embedded device, maintaining communication with the first and second mobile devices.

In some embodiments, the method further includes, at the embedded device, receiving an embedded device wide area network (WAN) Internet protocol (IP) address. Maintaining communication with the first and second mobile devices may include notifying the first and second mobile devices of the new embedded device WAN IP address via respective additional push notifications. Alternatively, maintaining communication with the first and second mobile devices may include the first and second mobile devices using a domain name to retrieve the new embedded device WAN IP address from a dynamic domain name system (DDNS) server.

Some embodiments further include establishing communication with the second mobile device by emailing an invitation from the first mobile device to the second mobile device, the invitation prompting the second mobile device to download an application and to transmit the identifier of the second mobile device to the first mobile device. In some embodiments, transmitting the identifier of the second mobile device to the first mobile device includes emailing a reply message to the first mobile device, the reply message prompting the first mobile device to transmit the identifier of the second mobile device to the embedded device.

In some embodiments, receiving the digital information from the first mobile device includes, at the embedded device, transmitting to the first mobile device a second push notification including an invitation for the mobile device to share the digital information, the first mobile device transmitting the digital information to the embedded device responsive to the second push notification.

In some embodiments, notifying the second mobile device of the digital information via the push notification includes generating a message relating to the digital information and transmitting the message from the embedded device through a Global Push Notification Server or third-party push notification service.

Some embodiments further include, at the second mobile device, receiving the push notification; and at the second mobile device, responsive to receipt of the push notification, requesting the digital information from the embedded device.

Some embodiments further include storing the digital information at the embedded device. The embedded device may notify the second mobile device of the digital information at a predetermined period after storing the digital information at the embedded device.

Some embodiments further include receiving at the embedded device, from the Internet or from one of the first and second mobile devices, an embedded device component of an application. The one of the first and second mobile devices may push the embedded device component to the embedded device. Alternatively, the embedded device may request the embedded device component from the one of the first and second mobile devices responsive to detection by the embedded device of a mobile device component of the application on the one of the first and second mobile devices.

In some embodiments, the embedded device is selected from the group consisting of: a gateway, a wireless gateway, a router, a wireless router, a media player, a wireless media player, an access point, a wireless access point, a network access storage (NAS) device, a thumb drive, and an embedded server.

Some embodiments further include, at the embedded device, transmitting the digital information to a second embedded device; at the second embedded device, notifying a third mobile device of the digital information via a second push notification; and at the second embedded device, maintaining communication with the third mobile device.

Some embodiments further include establishing communication between the embedded device and the second embedded device by performing steps including: at the embedded device, receiving an identifier of the third mobile device from the first mobile device; at the embedded device, sending an embedded device wide area network (WAN) Internet protocol (IP) address and access credential to the third mobile device via a third push notification; at the second embedded device, receiving the embedded device WAN IP address and access credential from the third mobile device; and at the second embedded device, transmitting a second embedded device WAN IP address and second access credential to the embedded device.

Some embodiments further include transmitting second digital information from the embedded device to at least one of the first and second mobile devices on a high priority basis via a second push notification.

Under another aspect of the present invention, an embedded device for sharing digital information between first and second mobile devices is provided. The embedded device may include a sharing module configured to receive the digital information from the first mobile device; a push module configured to notify the second mobile device of the digital information via a push notification; and an IP address update module configured to maintain communication with the first and second mobile devices.

In some embodiments, the IP address update module is configured to receive a new embedded device wide area network (WAN) Internet protocol (IP) address and to maintain communication with the first and second mobile devices by notifying the first and second mobile devices of a new WAN IP address via respective additional push notifications. Alternatively, the first and second mobile devices may be configured to use a domain name to retrieve the new embedded device WAN IP address from a dynamic domain name system (DDNS) server.

In some embodiments, the embedded device further comprises an enrollment module configured to receive an identifier of the second mobile device from the first mobile device.

In some embodiments, the sharing module further is configured to transmit to the first mobile device a second push notification inviting the first mobile device to share the digital information, the first mobile device transmitting the digital information to the embedded device responsive to the invitation.

In some embodiments, the push module is configured to notify the second mobile device of the digital information via the push notification by generating a message relating to the digital information and transmitting the message through a Global Push Notification Server or a third-party push notification service.

In some embodiments, the sharing module further is configured to transmit the digital information to the second mobile device responsive to a request for the digital information by the second mobile device following the notification step.

Some embodiments further include a storage device, the sharing module further being configured to store the digital information in the storage device.

In some embodiments, the sharing module is configured to notify the second mobile device of the digital information at a predetermined period after storing the digital information in the storage device.

Some embodiments further include a new application module configured to receive from the Internet or from one of the first and second mobile devices an embedded device component of an application.

In some embodiments, the new application module is configured to receive a push of the embedded device component from the one of the first and second mobile devices. Alternatively, the new application module may be configured to request the embedded device component from the one of the first and second mobile devices responsive to detection of a mobile device component of the application on the mobile device.

In some embodiments, the embedded device is selected from the group consisting of: a gateway, a wireless gateway, a router, a wireless router, a media player, a wireless media player, an access point, a wireless access point, a network access storage (NAS) device, a thumb drive, and an embedded server.

Some embodiments further include a merge module configured to transmit the digital information to a second embedded device. Optionally, the merge module of the embedded device further is configured to receive an identifier of a third mobile device from the first mobile device, to send an embedded device wide area network (WAN) Internet protocol (IP) address and an access credential to the third mobile device via a third push notification, and to receive a second embedded device WAN IP address and second access credential from the second embedded device.

In some embodiments, the push module is configured to transmit second digital information to at least one of the first and second mobile devices on a high priority basis via a second push notification.

BRIEF DESCRIPTION OF DRAWINGS

FIGS. 5A-5C illustrate steps executed by a wireless gateway during exemplary methods for sharing digital information between mobile devices using a family cloud.

FIGS. 8A-8E illustrate steps executed by embedded devices and by mobile devices during exemplary methods for establishing a merged family cloud.

DETAILED DESCRIPTION

Overview

Figure 1:
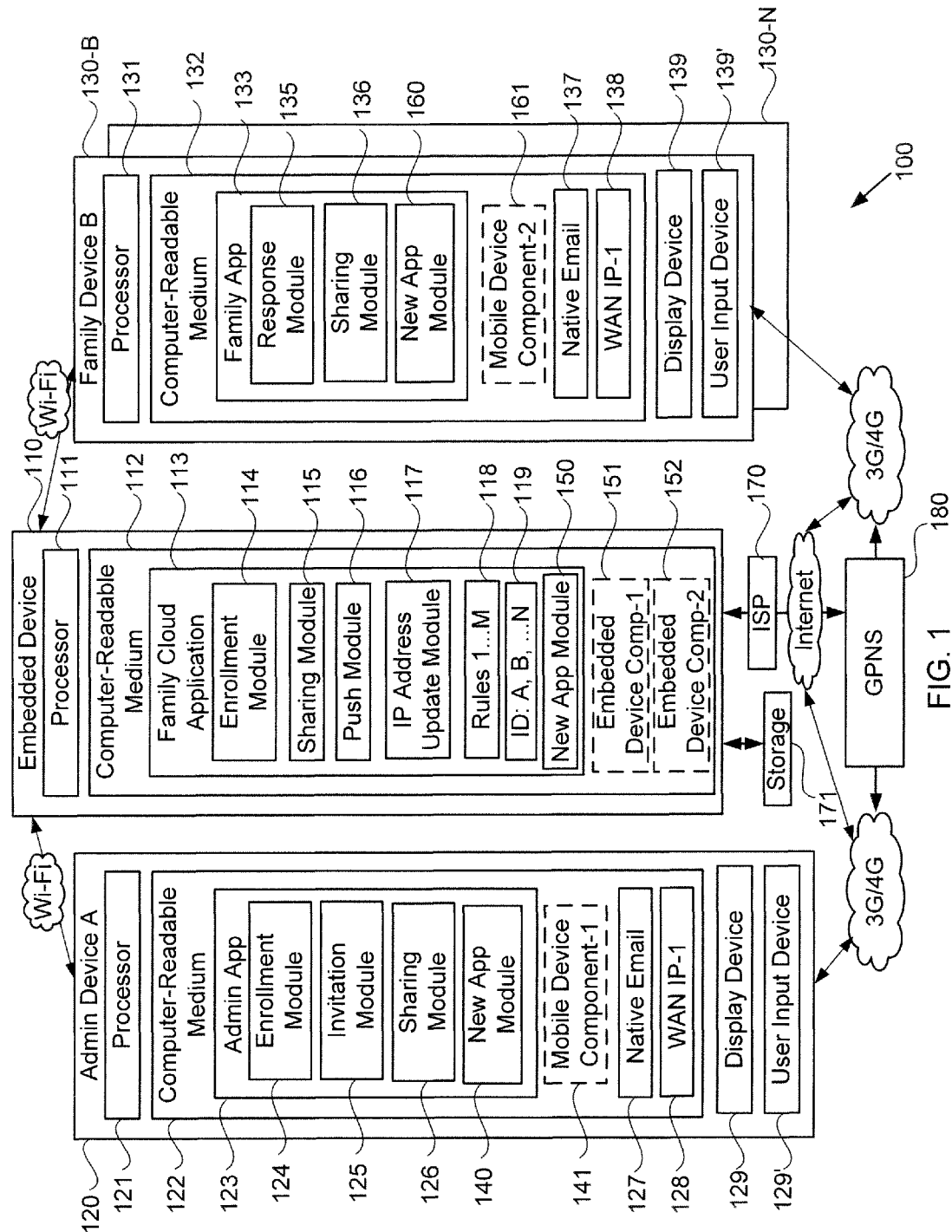
FIG. 1 illustrates an exemplary embedded device-based system for providing a family cloud for sharing digital information between mobile devices.

Exemplary embodiments of the present invention provide embedded device-based systems and methods for establishing wireless clouds for sharing digital information between mobile devices of friends and family. More specifically, embodiments of the present invention may provide an embedded device for use in a home networking environment, e.g., that is configured to connect to the Internet via an Internet service provider (ISP) and to connect to mobile devices via Wi-Fi, e.g., in a local area network (LAN) environment, and also that is configured to connect to remote mobile devices via a wide area network (WAN) environment. The present embedded device also includes different logical modules therein that are configured to establish a "family cloud" that permits only selected mobile devices—such as those of friends and family—to wirelessly share digital information, such as digital media, with one another via the LAN or WAN environment. In particular, the present embedded device may enroll a first mobile device as an "admin" device associated with the embedded device, and may permit that device to manage the cloud and to invite other selected mobile devices to enroll to the family cloud, e.g., to be associated with the embedded device. However, such selected mobile devices need not necessarily be within Wi-Fi range of the embedded device to be invited or to enroll to the family cloud. Instead, the invitation may be sent from the admin device using the device's native email application and transmitted to the selected mobile device via the Internet or via the LAN environment if local, and opened and accepted at the selected mobile device, wherever that mobile device may be. Preferably, the invitation enrolls the mobile device into the family cloud without requiring any technical knowledge on the user's part, e.g., without requiring knowledge of the embedded device's wide area network (WAN) IP address, ESSID, or credential, and indeed without requiring the mobile device ever to be within Wi-Fi range of the embedded device. For example, a dedicated application or "app" for the mobile devices' use in enrolling to and utilizing the family cloud in a user-friendly manner may be downloaded from an online store, such as iTunes™ (Apple Inc., Cupertino, Calif.), Google™ Play (Google Inc., Mountain View Calif.), Windows™ Phone Store (Microsoft Corporation, Redmond Wash.), or BlackBerry™ World (Blackberry, Waterloo, Ontario, Canada).

Mobile devices enrolled to the family cloud, e.g., associated with the embedded device, may share digital information with one another in a streamlined, user-friendly manner via the LAN or WAN environment. For example, the mobile device may upload digital information to the embedded device either via Wi-Fi (LAN) or via a cellular data network such as 3G or 4G (WAN). The embedded device then may send a push notification of that digital information to the other enrolled mobile devices using a Global Push Notification Server, such as maintained by Apple Inc. or Google Inc., that is connected to the Internet, or using a third-party push notification service that may utilize such a Global Push Notification Server; of course, if any enrolled mobile devices are within the LAN environment of the embedded device, then the embedded device instead may notify such mobile devices of the digital information using a direct message, rather than a push notification. Accordingly, the mobile devices may receive notifications of the digital information, wherever those mobile devices may be. Preferably, the embedded device also includes an internal storage device or is configured to connect to an external storage device, such as a hard drive, in which the digital information may be stored and later retrieved as desired. As such, the amount of available storage space and the type of information that may be stored therein may be determined by the size of the storage device that the user is willing or able to purchase; for example, at present, external hard drives having 1 TB or more of storage space are commercially available for $100 or less. Such an internal or external storage device may not present a particularly desirable target for hacking, because it only may contain the digital information of a few users. In comparison, the above-mentioned cloud based services may limit the user to only a few GB of storage space unless additional fees are paid to obtain incrementally more space, and may present a far more desirable target for hacking because the digital information of millions of users may be stored together.

Additionally, in some embodiments, multiple embedded devices may be networked together over the Internet, and the family clouds of those embedded devices may be merged together to provide a "merged" cloud in which digital information may be shared between multiple mobile devices. Such a merged cloud may facilitate communication between the multiple devices in a streamlined, user-friendly manner. As described in greater detail below, the embedded devices may store and utilize different rules for sharing and synchronizing digital information between the other embedded devices and the mobile devices, for example so as to quickly distribute higher priority information, and to efficiently and non-invasively distribute lower priority information.

Note that in preferred embodiments, the present embedded devices are wireless gateways, which are a stand-alone piece of equipment whose primary function is to route network traffic between a local area network (LAN) and a wide area network (WAN) such as the Internet, using a modem; that is, a wireless gateway includes the functionality both of a router and a modem. As is known in the art, gateways are embedded systems that have limited resources such as system memory, storage, and computing power. The logical modules within the present embedded devices, e.g., wireless gateways, preferably provide the "family" cloud functionality without requiring significant modifications to the physical parameters of the gateway, e.g., without requiring significantly more system memory, storage, or computing power than typically is provided in an embedded device, e.g., gateway. In particular, the present embedded devices, e.g., wireless gateways, preferably are not part of a server, and indeed need not even be coupled to a personal computer. As is known in the art, the primary function of a server is to provide different kinds of applications or services to clients. Although technically savvy users may set up local media servers on a home personal computer that is connected to a gateway, and cloud-based services may store digital media on a remote server, the present embedded devices, e.g., wireless gateways may obviate the need to purchase, set up, or to utilize a local or remote server in order to establish a wireless cloud to share digital information between mobile devices. Other exemplary embedded devices that may be used to share digital information between mobile devices may include gateways, routers, wireless routers, media players, wireless media players, access points, wireless access points, network access storage (NAS) devices, thumb drives, and embedded servers.

A first embodiment of an embedded device-based system for providing a family cloud for sharing digital information between mobile devices, and methods and signaling protocols associated with same, will be described. Then, alternative systems, methods, and signaling protocols will be described.

Embedded Device-Based System

FIG. 1 illustrates embedded device-based system 100 for providing a family cloud for sharing digital information between mobile devices, according to some embodiments of the present invention. System 100 includes embedded device 110, admin mobile device A 120, and a plurality of family mobile devices B . . . N 130-B . . . 130-N. Although certain functionalities of system 100 are primarily described below with reference to family device B 130-B, it should be understood that the other family devices may operate analogously to family device B. Furthermore, note that family devices B . . . N 130-B . . . 130-N need not necessarily be used or owned by a family member of the user who uses or owns admin device A 120, but instead may be owned by any friend, acquaintance, colleague, associate, or the like, or the user who uses or owns admin device A 120—that is, any individual or entity who that user wishes to share access to the family cloud established by embedded device 110.

Embedded device 110 may include processor 111, non-volatile computer-readable medium or memory 112, a Wi-Fi transceiver (not specifically illustrated) via which the embedded device may wirelessly connect to admin device A 120 and optionally also family device B, a first input/output (I/O) port (not specifically illustrated) via which the embedded device may connect to the Internet, optionally via internet service provider (ISP) 170, and a second I/O port (not specifically illustrated) via which the embedded device may connect to an external storage device 171; alternatively, the embedded device may include an internal storage device (not illustrated). For example, in some embodiments the first I/O port includes a modem, such as an analog modem, cable modem, long-term evolution (LTE) modem, fiber modem, digital subscriber line (DSL) modem, or very-high-bit-rate digital subscriber line (VDSL) modem, that facilitates connection between embedded device 110 and ISP 170 and then to the Internet via appropriate cabling. In other embodiments, embedded device 110 is an embedded device lacking modem functionality and instead is configured to connect to the Internet through a modem, e.g., via the first I/O port and a modem and Ethernet cable (not illustrated). The second I/O port may include a USB port, USB 2.0 port, USB 3.0 port, firewire port, or any other suitable port via which digital information may be transmitted to external storage device 171, e.g., an external hard drive based on FLASH, RAM, ROM, EPROM, EEPROM, or a magnetic or optical disk or tape. In one illustrative embodiment, storage device 171 includes a Wi-Fi or Bluetooth transceiver and the second I/O port of embedded device 110 includes the Wi-Fi transceiver (not illustrated) or a Bluetooth transceiver via which embedded device 110 may wirelessly communicate with storage device 171. As noted above, the embedded device alternatively may include an internal storage device such as a hard drive or flash drive. In one illustrative embodiment, the embedded device includes both an internal storage device and a second I/O port via which the embedded device may connect to an external storage device 171.

Preferably, embedded device 110 is configured to allow mobile devices connected thereto to access the Internet via the Wi-Fi transceiver and port first I/O port upon exchange of suitable credentials, such as a login and password or an encryption key. For example, the Wi-Fi transceiver may be configured to receive radio frequency (RF) signals from mobile devices such as admin device 120, and to communicate a digital representation of such signals to processor 111; and to receive digital signals from processor 111 and to transmit RF representations of those signals to mobile devices such as admin device 120. The first I/O port may be configured to receive digital signals from the Internet, and to communicate those signals to processor 111; and to transmit digital signals from processor 111 to the Internet. Computer-readable medium 112 of embedded device 110 may include an internal or external memory device, such as FLASH, RAM, ROM, EPROM, EEPROM, or a magnetic or optical disk or tape.

Computer-readable medium 112 of embedded device 110 is configured to store family cloud application 113, which includes enrollment module 114, sharing module 115, push module 116, IP address update module 117, rules 1 . . . M 118, and identifiers A, B, . . . N 119. As described in greater detail below with reference to FIGS. 2 and 3, enrollment module 114 is configured to cause processor 111 to enroll admin device A 120 and family devices B . . . N 130-B . . . 130-N to a family cloud, e.g., to associate such devices with embedded device 110, via which the devices may wirelessly share digital information with one another. As described in greater detail below with reference to FIG. 4, sharing module 115 is configured to cause processor 111 to receive digital information from one of admin device A 120 and family devices B . . . N 130-B . . . 130-N and to cause push module 116 to push a notification of the digital information to the others of such devices. In one illustrative embodiment, push module 116 pushes such a notification via the first I/O port and via Global Push Notification Server (GPNS) 180 connected to the Internet, optionally via a third-party push notification service. However, note that if any of admin device A 120 or family devices B . . . N 130-B . . . 130-N are in the LAN environment of embedded device 110, then push module 116 instead may notify such mobile devices of the digital information using a direct message, rather than a push notification.

As described in greater detail below with reference to FIG. 6, IP address update module 117 is configured to cause processor 111 to send to admin device A 120 and family devices B . . . N 130-B . . . 130-N a new WAN IP address for embedded device 110, e.g., if ISP 170 assigns a new WAN IP address to the embedded device. In one illustrative embodiment, IP address update module 117 causes push module 116 to push the new WAN IP address via the first I/O port and via GPNS 180 connected to the Internet; alternatively, if any of admin device A 120 or family devices B . . . N 130-B . . . 130-N are in the LAN environment of embedded device 110, then push module 116 instead may notify such mobile devices of the new WAN IP address using a direct message, rather than a push notification. As described in greater detail below with reference to FIGS. 5A-5D, the various modules of family cloud application 113 may facilitate or control the sharing of digital information between admin device A 120 and family devices B . . . N 130-B . . . 130-N based on one or more rules 1 . . . M 118.

Computer-readable medium 112 also stores identifiers 119 A, B, . . . N for admin device A 120 and family devices B . . . N 130-B . . . 130-N, e.g., one or more notification receipt identifiers (NRID), international mobile station equipment identity (IMEI) numbers, mobile equipment identifiers (MEID), or electronic serial numbers (ESN). Identifiers 119 may be stored within computer-readable medium 112 during enrollment of admin device A and family devices B . . . N 130-B . . . 130-N using enrollment module 114, and may be used by push module 116 to push digital information or a new WAN IP address of embedded device 110 to admin device A 120 and family devices B . . . N 130-B . . . 130-N. In the illustrated embodiment, identifiers 119 A, B, . . . N are stored within family cloud application 113, but it should be understood that the identifiers need not necessarily be stored within the family cloud application so long as they may be accessed by such application.

As illustrated in FIG. 1, computer-readable medium 112 preferably further stores new application ("app") module 150, an embedded device component of a first new application ("embedded device comp-1") 151, and an embedded device component of a second new application ("embedded device comp-2") 152. As described in greater detail herein, new app module 150 may facilitate loading of executable modules or components of new applications onto embedded device 110, which modules or components may facilitate sharing of digital information with mobile devices 120 and 130 B . . . N. In the illustrated embodiment, new application module 150 is part of family cloud application 113.

Admin device A 120 includes processor 121, computer-readable medium or memory 122, display device 129, user input device 129', a Wi-Fi transceiver (not illustrated), and a cellular data transceiver, e.g., a 3G or 4G transceiver (not illustrated). Computer-readable medium 122 of admin device A 120 may include an internal or external memory device, such as FLASH, RAM, ROM, EPROM, EEPROM, or a magnetic or optical disk or tape. Computer-readable medium 122 of admin device A 120 is configured to store admin application ("admin app") 123. Admin application 123 includes enrollment module 124 configured to cause processor 121 to enroll admin device A 120 to the family cloud of embedded device 110, e.g., to become associated with the embedded device, preferably by interacting with enrollment module 114 of the embedded device such as described below with reference to FIG. 2. Admin application 123 also includes invitation module 125 via which family devices B . . . N 130-B . . . 130-N may be invited to enroll to the family cloud of embedded device 110, e.g., to become associated with the embedded device, preferably by interacting with enrollment module 114 of the embedded device such as described below with reference to FIG. 3. Admin application 123 further includes sharing module 126 configured to cause processor 121 to receive digital information and to transmit that digital information to embedded device 110 for distribution to family devices B . . . N 130-B . . . 130-N by interacting with sharing module 115 and push module 116 of the embedded device such as described below with reference to FIG. 4. Computer-readable medium 122 further preferably stores new application module ("new app module") 140 and a mobile device component of a first new application ("mobile device component-1") 141, which as described herein may further facilitate the implementation of new applications for sharing information between embedded device 110 and admin device A 120. In the illustrated embodiment, new application module 140 is part of admin application 123.

As noted above, preferably admin application 123 may be downloaded from an online app store. For example, a dedicated application or "app" for the mobile devices' use in enrolling to and utilizing the family cloud in a user-friendly manner may be downloaded from an online store, such as iTunes™, Google™ Play, Windows™ Phone Store, or BlackBerry™ World. In one illustrative embodiment, embedded device 110 includes printed instructions that describe how to download admin application 123, or generates a message to admin device A 120 that contains digital instructions via which the user may download admin application 123. Computer-readable medium 122 further may store a native email application 127 and the WAN IP address 128 of embedded device 110, which enrollment module 124 may receive from embedded device 110 when connecting via Wi-Fi to the embedded device during enrollment to the family cloud.

Family device B 130-B includes processor 131, computer-readable medium or memory 132, display device 139, user input device 139', a Wi-Fi transceiver (not illustrated), and a cellular data transceiver, e.g., a 3G or 4G transceiver (not illustrated). Computer-readable medium 132 of family device B 130-B may include an internal or external memory device, such as FLASH, RAM, ROM, EPROM, EEPROM, or a magnetic or optical disk or tape. Computer-readable medium 132 of family device B 130-B is configured to store family application ("family app") 133. Family application 133 includes response module 135 configured to cause processor 131 to enroll family device B 130-B to the family cloud of embedded device 110 responsive to an invitation sent from invitation module 125 of admin device A 125, preferably by interacting with enrollment module 114 of the embedded device such as described below with reference to FIG. 3. Family application 133 further includes sharing module 136 configured to cause processor 131 to receive digital information and to transmit that digital information to embedded device 110 for distribution to admin device A 120 and to others of family devices C . . . N 130-C . . . 130-N by interacting with push module 116 of the embedded device such as described below with reference to FIG. 4. Computer-readable medium 132 further preferably includes new application module ("new app module") 160 and a mobile device component of a second new application ("mobile device component-2") 161, which as described herein may further facilitate the implementation of new applications for sharing information between embedded device 110 and family device B 130-B. In the illustrated embodiment, new application module 160 is part of family application 133.

As noted above, preferably family application 133 may be downloaded from an online app store such as iTunes™, Google™ Play, Windows™ Phone Store, or BlackBerry™ World. In one illustrative embodiment, the invitation sent from invitation module 125 contains a link that causes family application 133 to be downloaded to and installed on family device B 130-B, thus reducing the burden on the owner of family device B to identify, download, and install the family application. Additionally, note that family application 133 and admin application 123 may be different functionalities of the same application. Computer-readable medium further may store a native email application 137 and the WAN IP address 138 of embedded device 110, which response module 135 may receive from embedded device 110 during enrollment to the family cloud. As noted above, family devices C . . . N 130-C . . . 130-N may be configured analogously to family device B 130-B.

In many regards, embedded device 110, admin device A 120, and family devices B . . . N 130-B . . . N may be otherwise "off-the-shelf," commercially available components that are modified so as to include features that facilitate establishing, enrolling in, and participating in a family cloud. For example, admin device A 120 and family devices B . . . N 130-B . . . 130-N each may be a commercially available smartphone, such as an iPhone, Android-based phone, BlackBerry, or Windows-based phone, or another suitable device that may wirelessly connect to an embedded device, such as a laptop computer, personal digital assistant, iPad, tablet computer, netbook, and the like. Admin device A 120 and family devices B . . . N 130-B . . . 130-N need not necessarily be of the same type as one another, e.g., may include a mixture of iPhone or iPad devices, Android-based devices, BlackBerry devices, or Windows-based devices. However, in the illustrated embodiment, admin device A 120 is configured to store in computer-readable medium 122 admin application 123 and WAN IP address 128 for use in enrolling in and participating in the family cloud, and family devices B . . . N 130-B . . . 130-N respectively are configured to store in computer-readable medium family application 133 and WAN IP address 138 for use in enrolling in and participating in the family cloud.

In one exemplary embodiment, embedded device 110 may contain analogous components as a commercially available fiber optic modem gateway, a DSL or VDSL modem gateway, analog modem gateway, cable modem gateway, fiber modem gateway, LTE modem gateway, or any other suitable gateway that may be connected to the Internet and may provide a wireless connection between a mobile device and the Internet. However, in the illustrated embodiment, embedded device 110 is further configured to store in computer-readable medium 112 family cloud application 113 and mobile device identifiers 119 for use in sharing digital information between admin device A 120 and family devices B . . . N 130-B . . . 130-N, such as described below with reference to FIG. 4. Additionally, embedded device 110 is configured to communicate with external storage device 171, the capacity of which may be defined by the user and which may be replaced or augmented at relatively low cost, or an internal storage device, which optionally may be made replaceable or upgradable by the user or by a certified technician.

Moreover, so as to support multiple types of digital information and multiple types of interactions with admin device A 120 and family devices B . . . N 130-B . . . 130-N, embedded device 110 preferably is modified so as to support runtime executable software installation, e.g., so as to include new application module 150 which facilitates the downloading of embedded device components or modules of one or more new applications, e.g., "embedded device comp-1" of a first new application and "embedded device comp-2" of a second new application. As is known in the art, existing embedded software on a gateway may not necessarily support user space executable module upload or installation—that is, may not necessarily support installation of a new application. Although open source code is available that supports user space executable module upload, such code may only permit a single authority—that is, a single mobile device—to upload executable modules. Such a limitation is undesirable because a family cloud preferably would permit any device enrolled within the cloud to upload an executable module, and thus permit any such mobile device to install on the embedded device a new application having a component or module that interacts with a corresponding component or module on the mobile device. Also, such code further may require that authority to maintain the connection to the embedded device at all times, e.g., to a Linux kernel within a gateway, in order to maintain the executable module in an open state. For example, if a mobile device connects to a previously known gateway, the embedded software within the gateway may assign logical input/output devices for the mobile device. If the logical input/output devices are not detected, for example if the mobile device goes into sleep mode, then the software may close the executable module. Preferably, family cloud application 113 is configured to permit any authority—that is, any mobile device that has enrolled to the family cloud—to upload executable application components or modules to embedded device 110, and to maintain the components or modules in an active state even in the absence of detectable logical input/output devices so that each mobile device may interact with the components or modules.

Additionally, in typical interactions between a previously known cloud server and a client thereof, e.g., a mobile device, the server and the client may share similar computing environments as one another, e.g., may both be based in the same or a related computer language as one another, which may simplify the development of interactive applications that run on both the server and the client. However, within system 100, the computing environment of embedded device 110 may be significantly different than that of admin device A 120 and family devices B . . . N 130-B . . . 130-N, which may complicate the development of interactive applications having components or modules that respectively run on both the embedded device and the mobile devices. For example, the computing environment of embedded device 110 may be based in the C programming language, while the computing environments of admin device A 120 and family devices B . . . N 130-B . . . 130-N may be based in JavaScript or Erlang.

So as to facilitate interactions therebetween, embedded device 110, admin device A 120, and family devices B . . . N 130-B . . . 130-N may include additional modules that facilitate the installation and execution of complementary components of a new application on the embedded device and mobile devices, respectively. Specifically, embedded device 110 includes new application module 150, e.g., as part of family cloud application 113; admin device A 120 includes new application module 140, e.g., as part of admin application 123; and family device B 130-B includes new application module 160, e.g., as part of family application 133.

Users respectively may download new applications onto admin device A 120 or family device B 130-B, e.g., by downloading the new application from an online app store such as mentioned herein or otherwise known in the art. Preferably, the new application includes two different components: a first component for use at the mobile device, e.g., admin device A 120, and a second component for use at the embedded device 110. During execution on admin device A 120 and embedded device 110, the components of the new application may share digital information with one another, e.g., the mobile device component 141 may transmit first digital information from the admin device to the embedded device, and the embedded device component 151 may transmit second digital information from the embedded device to the admin device. In one illustrative embodiment, the mobile device component 141 may be a web based native application running under the mobile device's hypertext markup language (HTML) and JavaScript environment and configured to interact with the embedded device component-1 151, and the second component 151 may be a non-SQL database "object"-based application configured to interact with mobile device component 141. Analogously, embedded device 110 may include different embedded device components for different new applications. For example, a second new application downloaded onto family device B 130-B may include a mobile device component 161, e.g., an HTML and JavaScript base application, and an embedded device component-2 152 configured to interact with the mobile device component 161, e.g., a non-SQL database object-based application.

Indeed, with such an architecture, the admin application 123 and family application 133 may have flexible web-application based graphical user interfaces (GUIs), and at the same time may leverage the current mobile device application open platform development environment. Another benefit of such an application design architecture is that the new application module 140 or 160 may push the embedded device component 151 or 152 of the new application to embedded device 110 automatically without the need for user intervention, for example so long as the user keeps an "automatic upload" default within admin application 123 or family application 133; or alternatively the new application module 150 may request the embedded device component of the new application from new application module 140 or 160, e.g., responsive to detection of the new application at the mobile device; or alternatively the new application module 150 may download the embedded device component of the new application via the Internet, e.g., responsive to detection of the new application at the mobile device. Further details of downloading and executing mobile and embedded device components of new applications are provided further below with reference to FIGS. 11A-11B.

Additionally, it should be understood that new application module 140 optionally may be suitably implemented within family cloud application 113, and similarly new application modules 150 and 160 optionally may be suitably implemented within admin application 123 and family application 133; alternatively, such new application modules 140, 150, and 160 may be implemented within other applications, or even as stand-alone applications. That is, the use of new application modules, and the use thereof to obtain and execute mobile device and embedded device components of new applications that may be selected by the user, may be used to facilitate family clouds, but is not limited to implementation in the context of family clouds, although family clouds may particularly benefit from such modules and components.

Methods of Enrolling Mobile Devices to Family Cloud

Figure 2:
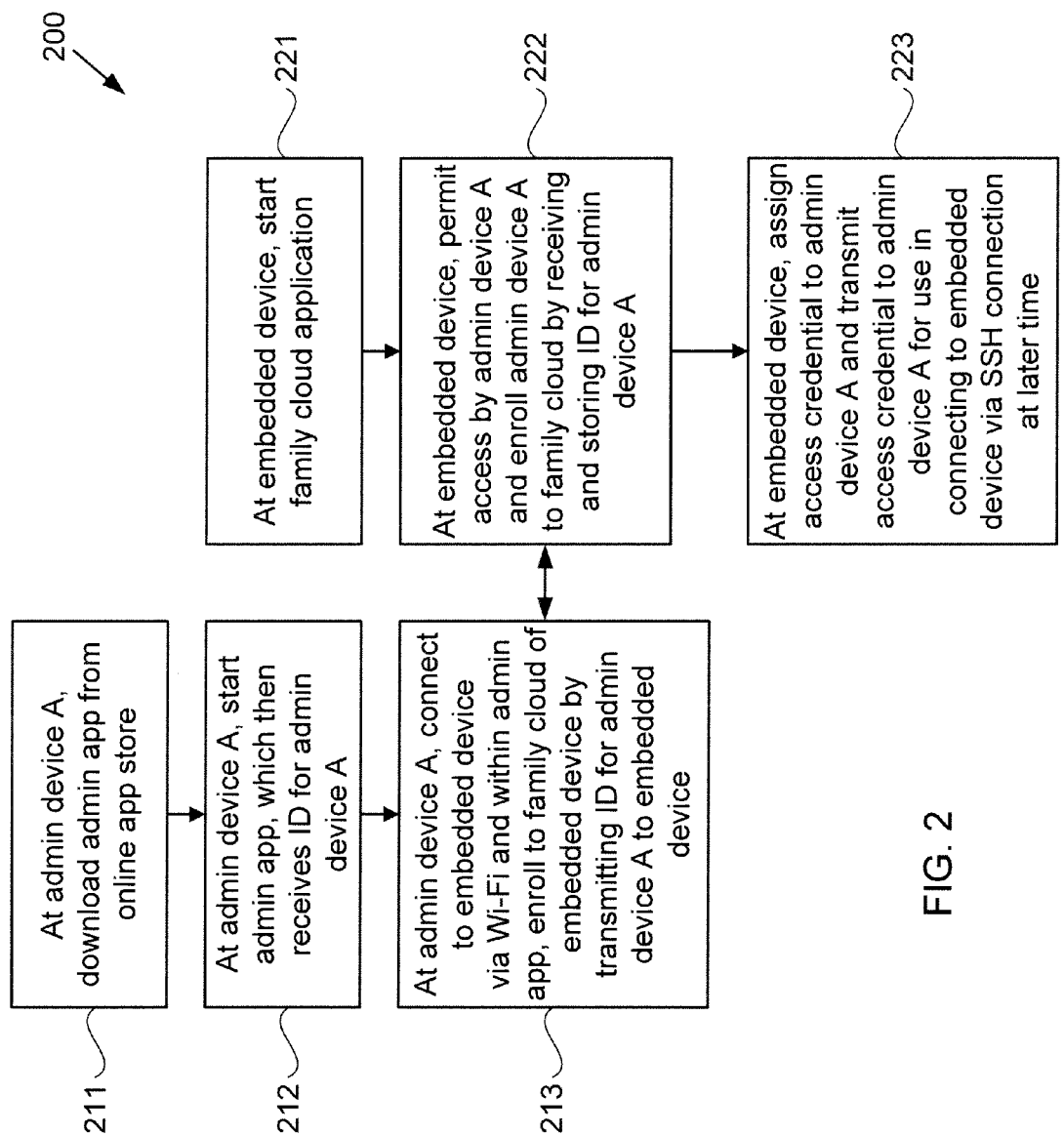
FIG. 2 illustrates steps executed by a mobile device and an embedded device during an exemplary method for enrolling the mobile device to a family cloud.
Figure 3:
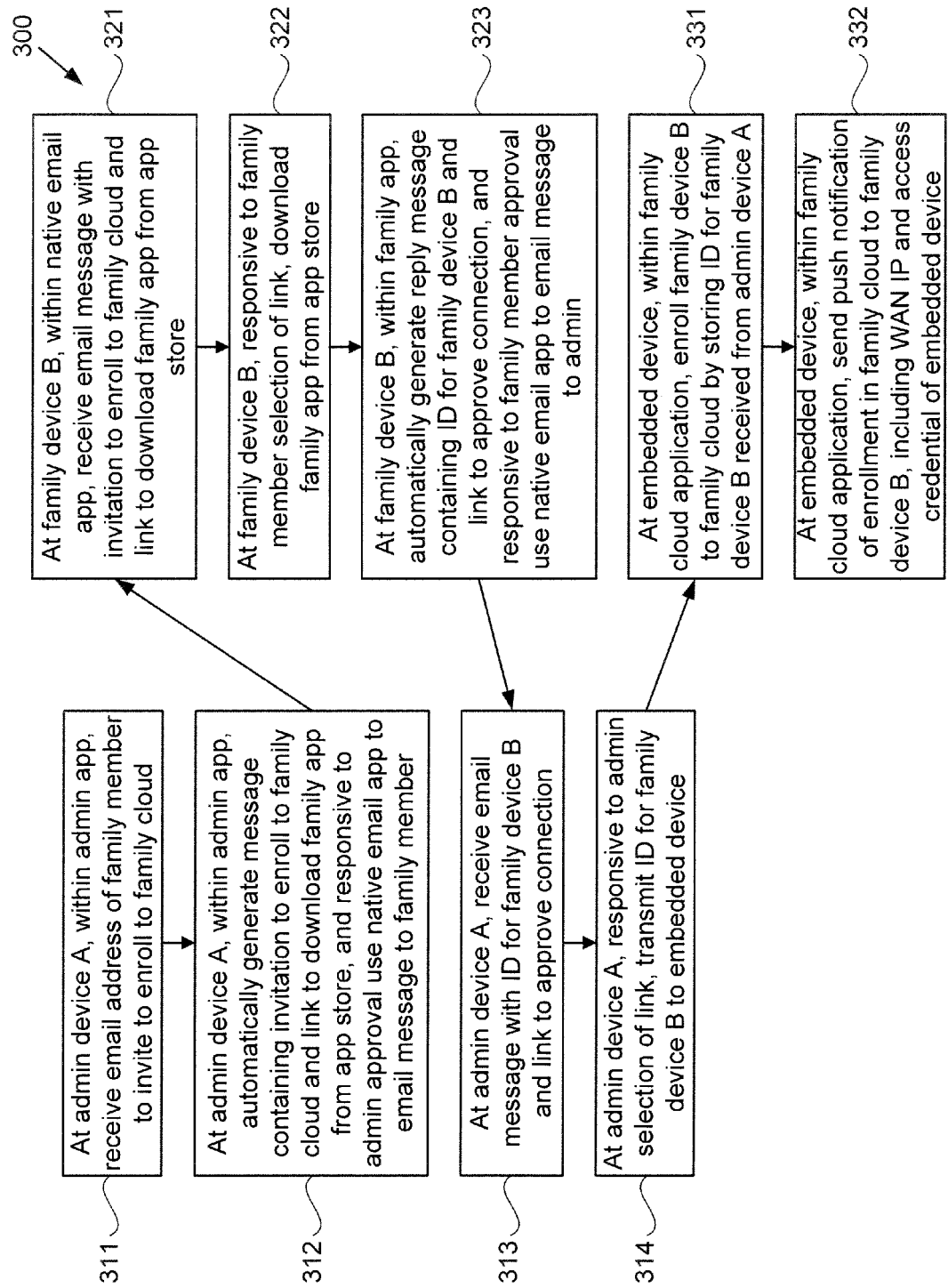
FIG. 3 illustrates steps executed by an embedded device and by mobile devices during an exemplary method for enrolling another mobile device to a family cloud.

FIGS. 2 and 3 illustrate steps executed by mobile devices and an embedded device such as a embedded device during exemplary methods for enrolling the mobile device to a family cloud, e.g., for associating mobile devices with the embedded device. Specifically, FIG. 2 illustrates steps in an exemplary method 200 for enrolling an admin device, e.g., for enrolling admin device A 120 to the family cloud of embedded device 110 illustrated in FIG. 1, while FIG. 3 illustrates steps in an exemplary method 300 for enrolling a family device, e.g., for separately enrolling each of family devices B . . . N 130-B . . . 130-N illustrated in FIG. 1.

For enrolling an admin device, on the mobile device side, method 200 illustrated in FIG. 2 begins with an admin device A downloading an admin application ("app") from an online app store (step 211). For example, admin device A 120 illustrated in FIG. 1 may connect to the app store via a Wi-Fi connection to embedded device 110 and via ISP 170 to the Internet; via a Wi-Fi connection to a different embedded device and through the Internet; or through a cellular data connection such as 3G or 4G and through the Internet. Exemplary online app stores are mentioned above and known in the art. Embedded device 110 may be shipped to or otherwise provided to the user of admin device A 120 with a set of printed or electronic directions for explaining to the user the family cloud functionality of embedded device 110 and directing them to different online app stores via which the admin application may be downloaded to manage the family cloud. In one illustrative embodiment, the admin application is specifically configured only for use on admin devices for use in managing the family cloud of a given embedded device. Alternatively, the admin application for use by admin devices and the family application (described in greater detail below) for use by family devices may one and the same, but only admin devices may use certain features of that application to manage the family cloud. The use of the terms "admin application" and "family application" are intended to encompass both alternatives.

Continuing on the mobile device side, method 200 continues with admin device A starting the admin application, which then receives an identifier for admin device A (step 212). In one illustrative embodiment, upon starting, the admin application is assigned an identifier such as an NRID by a Global Push Notification Server (GPNS) or a third party push notification service and then receives and stores the identifier.

On the embedded device side, method 200 illustrated in FIG. 2 includes starting a family cloud application (step 221). In one example, embedded device 110 may start family cloud application 113 stored in computer-readable medium 112 when the embedded device is turned on and may maintain that application in an active state at any time that the embedded device is on.

On the mobile device side, method 200 illustrated in FIG. 2 further includes the admin device A connecting to the embedded device via Wi-Fi and, within the admin application, transmitting the identifier (ID) for admin device A to the embedded device (step 213). In some circumstances, admin device A may already be connected to the embedded device, e.g., so as to download the admin application. In other circumstances, admin device A may have downloaded the admin application at an earlier time or via a different connection to the Internet. For example, enrollment module 124 of admin application 123 illustrated within FIG. 1 preferably includes a GUI that may be displayed on display device 129 of admin device A 120, and that includes a button prompting the user of to enroll to the family cloud. Upon the user's selection of that button via user input device 129', e.g., a touch screen on the admin device A, admin application 123 automatically may connect to embedded device 110 and may transmit the identifier A for admin device A to embedded device 110. The ID for admin device A may include, for example, a notification receipt identifier (NRID), international mobile station equipment identity (IMEI) number, mobile equipment identifier (MEID), or electronic serial number (ESN), or any other identifier via which the admin device A may be uniquely identified by the embedded device and via which the embedded device may send push notifications directly via a Global Push Notification Server or via a third-party push notification service, e.g., as described in greater detail below with reference to FIG. 4.

On the embedded device side, method 200 illustrated in FIG. 2 further includes permitting access by the admin device A and receiving and storing the identifier for admin device A (step 222), e.g., responds appropriately to the admin device A's actions during step 212 so as to establish bidirectional Wi-Fi communication with admin device A. Enrollment module 114 illustrated in FIG. 1 then may receive and store the ID for admin device A within computer-readable medium 112 for later use by push module 116 to send to admin device A 120 push notifications of digital information that embedded device 110 receives from other mobile devices enrolled to the family cloud, e.g., family device B 130-B, such as described below with reference to FIG. 4.

The embedded device then assigns an access credential to admin device A and transmits that access credential to admin device A, so that admin device A may connect to the embedded device via an SSH connection at a later time (step 223). As mentioned above, a mobile device may securely connect to an embedded device such as a wireless gateway through a suitable ESSID and by providing an access credential to the gateway to establish an SSH connection.

In some embodiments, to enroll additional mobile devices, such as any of family devices B . . . N 130-B . . . 130-N, to the family cloud, the steps of method 200 illustrated in FIG. 2 may be repeated by that mobile device and the embedded device. However, as mentioned above, users other than the admin may not be particularly technically savvy, and also may not be within Wi-Fi range of the embedded device. FIG. 3 illustrates method 300 via which the user of the admin device may invite any desired user—such as a family member, friend, acquaintance, colleague, associate, or the like—to join the family cloud of a embedded device in a manner that does not require technical expertise of that user beyond the ability to read an email, click on a link therein, and click on buttons soliciting the user's approval to enroll to the family cloud.

Specifically, method 300 illustrated in FIG. 3 begins on the mobile device side in which the admin device A, within the admin application, receives the email address of a family member or other user that the user of the admin device A wishes to invite to enroll to the family cloud so that they may share digital information with one another via the embedded device (step 311). For example, invitation module 125 within admin application 123 illustrated in FIG. 1 preferably includes a GUI that may be displayed on display device 129 of admin device A 120, and that includes a button prompting the user of that device to invite others to enroll to the family cloud. Upon the user's selection of that button via user input device 129', e.g., a touch screen on the admin device A, the GUI may display a field prompting the user to type in the email address of the family member to be invited using input device 129', or an interface permitting the user to select an email address from a contact list or address book stored on admin device A, using input device 129'.

Method 300 illustrated in FIG. 3 may continue on the mobile device side by automatically generating, within the admin application on admin device A, a message that contains an invitation to enroll to the family cloud and a link to download a family application from an online app store (step 312). Preferably, the admin application generates such a message using a native email application within admin device A, and the email is sent responsive to admin approval (step 312). For example, enrollment module 124 illustrated in FIG. 1 may generate the message with link within native email application 127 on admin device A 120, and the user may approve the message by clicking "send" within the native email application so as to cause the email to be sent to the email address of the user being invited to enroll to the family cloud. Preferably, the email message is relatively easy to understand by non-technically savvy users, e.g., explains that the family member has been invited to join a family cloud being managed by the user who sent the email, that family clouds permit family members to share digital information easily with one another, and that the family member may enroll to the family cloud by clicking the link within the message. The admin application may generate the link based on HTML code that identifies the name of the family application to be downloaded, and a source from which that application is to be downloaded, e.g., an app store or a web page. The admin device A then may send the email to the invited family member via an appropriate communications channel, e.g., via a Wi-Fi connection to embedded device 110 and via ISP 170 to the Internet; via a Wi-Fi connection to a different embedded device and through the Internet; or through a cellular data connection such as 3G or 4G and through the Internet.

Continuing with the mobile device side of method 300, but at a second mobile device, specifically family device B, a native email application therein receives the email message with the invitation to enroll in the family cloud and the link to download the family application from an online app store (step 321). For example, native email application 137 may display the email to the family member on display device 139, and may prompt the user to select the link using input device 139'.

Then, responsive to the family member's selection of the link, the family application may be downloaded from an online app store onto the family device B (step 322). In particular, the HTML code within the link may cause a native app store application (not illustrated) on the family device B to open and to navigate to an entry for the family app within the app store. The family member then may select "install" or other option to confirm that the application should be installed. Alternatively, the HTML code within the link may cause a native web browser application (not illustrated) to open and to navigate to a web page that contains different versions of the family application for different operating systems. The family member then may select the proper version for download, or alternatively the web page automatically may detect the proper version and cause that version to be downloaded to the family device B, thus further reducing the burden on the user.

Continuing with the mobile device side of method 300, still at the second mobile device, specifically family device B, the family application then automatically generates a reply to the invitation message using the native email application on that device (step 323). For example, response module 135 illustrated in FIG. 1 may generate the message with link within native email application 137 on family device B 130-B, and the family member may approve the message by clicking "send" within the native email application so as to cause the email to be sent to the email address of the user who sent the invitation to enroll to the family cloud. Preferably, the message contains an ID for family device B and a link to approve the connection (step 323). The ID for family device B may include, for example, a notification receipt identifier (NRID), international mobile station equipment identity (IMEI) number, mobile equipment identifier (MEID), or electronic serial number (ESN), or any other identifier via which the family device B may be uniquely identified by the embedded device and via which the embedded device may send push notifications via a Global Push Notification Server or third-party push notification service, e.g., as described in greater detail below with reference to FIG. 4. The family application may generate the link based on HTML code that identifies the admin application or the invitation module therein, for use in completing enrollment of family device B to the family cloud in a later step. The family device B then may send the reply email to the user who sent the invitation message via an appropriate communications channel, e.g., via a Wi-Fi connection to embedded device 110 and via ISP 170 to the Internet; via a Wi-Fi connection to a different embedded device and through the Internet; or through a cellular data connection such as 3G or 4G and through the Internet. Note that for step 323, a Wi-Fi connection to embedded device 110 may be used if family device B is in the LAN environment.

Continuing with the mobile device side of method 300, admin device A receives the email message with the ID for family device B and the link to approve the connection (step 313). For example, native email application 127 may display the email to the family member on display device 129, and may prompt the user to select the link using input device 129'.

Then, responsive to the user's selection of the link, the ID for family device B may be transmitted to the embedded device from admin device A (step 314). In particular, the HTML code within the link may cause invitation module 125 of admin application 123 on admin device A 120 to open and automatically to transmit the ID for family device B to embedded device 110 illustrated in FIG. 1.

On the embedded device side, method 300 continues with the embedded device, from within the family cloud application, enrolling family device B to the family cloud of the embedded device by receiving and storing the ID for family device B (step 331). For example, enrollment module 114 illustrated in FIG. 1 may receive and store the ID for family device B within computer-readable medium 112 for later use by push module 116 to send to family device B 130-B push notifications of digital information from other mobile devices enrolled to the family cloud, e.g., admin device A 120, such as described below with reference to FIG. 4.

Continuing on the embedded device side, so as to confirm the enrollment of family device B in the family cloud, the family cloud application of the embedded device then may send a push notification of the enrollment in the family cloud to family device B based on the stored ID for device B (step 332). For example, enrollment module 114 illustrated in FIG. 1 may pass a message indicating successful enrollment to push module 116, with a request to send the message to family device B 130-B. Push module 116 then may retrieve the ID 119 for family device B from computer-readable medium 112, and may send the message and the ID for family device B to Global Push Notification Service (GPNS) 180 via ISP 170 and the Internet, and optionally also via a third-party notification service. The GPNS 180 then may send the message in the form of a push notification to family device B 130-B. Preferably, the message may include an WAN IP address 138 for embedded device 110, and also an ESSID and access credential for embedded device 110, which family device B 130-B may store in computer-readable medium 132 as shown in FIG. 1 and subsequently may use to connect to embedded device 110. Optionally, the WAN IP address or ESSID and access credential may be sent in the form of a link based on HTML code that causes family device B to configure itself appropriately so as to connect to the embedded device based on the WAN IP address or ESSID and access credential. Alternatively, the WAN IP address or ESSID and access credential for embedded device 110 may be sent in the invitation email from admin device A 120 during step 312. For example, the HTML code within the link of the invitation email may include the WAN IP address or ESSID and access credential of the embedded device and code causing family device B to configure itself appropriately so as to connect to the embedded device based on the WAN IP address or ESSID and access credential. Note that if family device B 130-B is in the LAN environment of embedded device 110, then the embedded device may transmit messages directly to the family device rather than using a Global Push Notification Server or third-party push notification service.

Note that although method 300 described above with reference to FIG. 3 primarily describes inviting a family member and enrolling that family member's device in the family cloud, it should be understood that the method may be used to invite and enroll any individual so desired by the user of admin device A. Moreover, note that the steps of method 300 need not necessarily be conditioned on approval by the respective user or family member. For example, the emails in step 312 and 323 may be sent automatically instead of responsive to approval by the user or family member, or the links within steps 322 or 314 may be automatically selected instead of selected by the user or family member. However, it is believed that conditioning such steps on user or family member activity may increase security of the family cloud and reduce the likelihood of enrolling an undesired user to the cloud or of enrolling to an undesired cloud by requiring user or family member confirmation that the parties are known to one another and that enrollment in the particular family cloud is desired.

Methods of Sharing Digital Information Using a Family Cloud

Methods of sharing digital information using a family cloud now will be described with reference to FIGS. 4-6.

Figure 4:
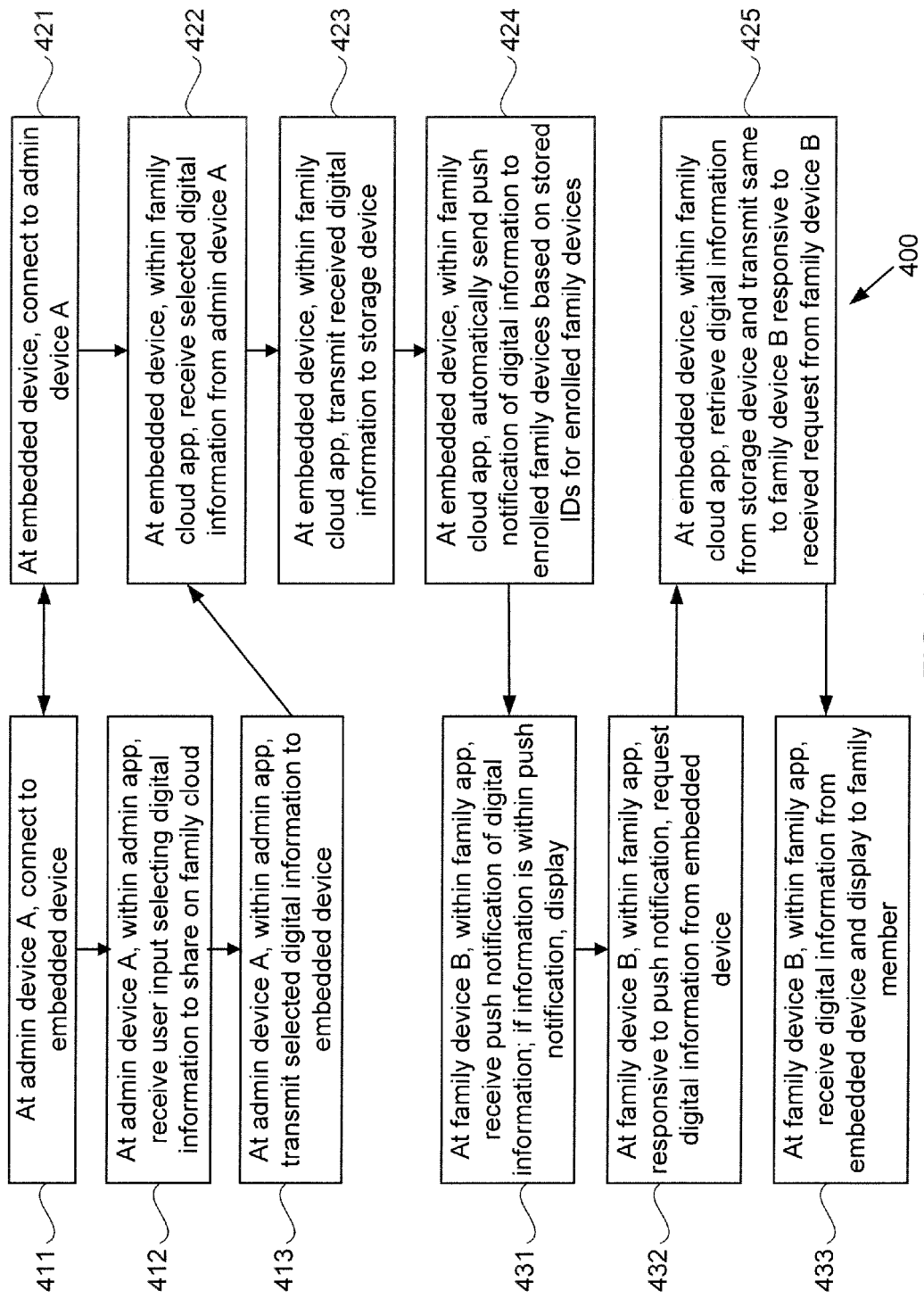
FIG. 4 illustrates steps executed by an embedded device and by mobile devices during an exemplary method for sharing digital information between the mobile devices using a family cloud.

Specifically, FIG. 4 illustrates steps executed by an embedded device and by mobile devices during an exemplary method 400 for sharing digital information between the mobile devices using a family cloud. The mobile device side of method 400 begins with admin device A connecting to the embedded device (step 411), and the embedded device side of method 400 begins with the embedded device connecting to the admin device A (step 421). Such a connection may be made in any suitable manner, such as via a direct Wi-Fi connection between the mobile device and embedded device 110; via a Wi-Fi connection between the mobile device and a different embedded device and through the Internet based on the WAN IP address of embedded device 110; or through a connection between the mobile device and a cellular data network such as 3G or 4G and through the Internet based on the WAN IP address of embedded device 110.

On the mobile device side, method 400 continues with receiving user input selecting digital information to share on the family cloud within the admin application on admin device A (step 412). For example, sharing module 126 within admin application 123 illustrated in FIG. 1 preferably includes a GUI that may be displayed on display device 129 of admin device A 120, and that includes a button prompting the user of that device to share digital information on the family cloud. Upon the user's selection of that button via user input device 129', e.g., a touch screen on the admin device A, the GUI may display a field or window prompting the user to enter a text-based message to be shared or to select a photograph, video, or other digital medium to be shared, using input device 129'. The admin application on admin device A then may transmit the selected digital information to the embedded device (step 413), e.g., via the connection established in step 411.

The embedded device side of method 400 continues with receiving at the embedded device, within the family cloud application, the digital information from admin device A (step 422). For example, sharing module 115 of family cloud application 113 illustrated in FIG. 1 may receive the digital information via the connection established in step 421.

At the embedded device, method 400 may continue with the family cloud app transmitting the received digital information to a storage device (step 423). For example, as noted above, embedded device 110 illustrated in FIG. 1 may include an I/O port (not specifically illustrated) to which an external storage device 171 may be connected, or alternatively or additionally may include an internal storage device. Usefully, the capacity of the internal or external storage device may be selected by the user, may be relatively large for relatively low cost (e.g., 1 TB or more for $100 or less), and may be upgraded or replaced substantially without the need to modify embedded device 110. In one illustrative embodiment, sharing module 115 of family cloud application 113 may transmit the received digital information to external storage device 171 via the I/O port for storage. Note that step 423 optionally may be omitted, in which case the digital information may be stored temporarily in computer readable medium 112, or may be performed at a different time during execution of method 400.

Continuing on the embedded device side, method 400 includes automatically sending a push notification of the digital information to any family devices that have enrolled to the cloud based on the stored IDs for the enrolled family devices (step 424). For example, push module 116 illustrated in FIG. 1 may prepare a message relating to the digital information, may retrieve the IDs 119 for all enrolled family devices from computer-readable medium 112, and may send the message and the IDs to GPNS 180 via ISP 170 and the Internet, and optionally also via a third-party notification service. The GPNS 180 then may send the message in the form of a push notification to the family devices for which it received IDs from embedded device 110. Methods of sending push notifications via a Global Push Notification Server or a third-party notification service are known in the art. Alternatively, if any of the family devices are in the LAN environment of the embedded device, then the embedded device instead may notify such family devices of the digital information using a direct message, rather than a push notification.

The message prepared by push module 116 may include the digital information itself, or may include a text-based description of the digital information, or may include a link to the digital information stored within the internal storage device or external storage device 171 connected to embedded device 110. For example, push notification services may only accept messages of a limited size, e.g., 256 bytes in the case of the Apple Push Notification Service, at present. If the digital information is sufficiently small as to be accepted by the Global Push Notification Server or third-party notification service, e.g., is a text-based message, or if any of the family devices are in the LAN environment of the embedded device, then the digital information may be pushed directly to the family devices. However, if the digital information is too large to be accepted by the Global Push Notification Server or third-party notification service, e.g., is a photograph or video, and if the family devices are not in the LAN environment of the embedded devices, then the message may include a description of the file name or type of the digital information, and any description of the digital information that the user of admin device A may have included, based upon which a family member may retrieve the digital information from the embedded device. Alternatively, push module 116 may generate within the message a link based on HTML code that identifies the file name of the digital information, and a source from which that information may be retrieved, e.g., the internal storage device or external storage device 171 connected to embedded device 110.

On the mobile device side of method 400 illustrated in FIG. 4, an exemplary family device B then receives the push notification of the digital information, e.g., via a Global Push Notification Server or third-party push notification service, or directly from the embedded device if the family device B is in the LAN environment of the embedded device (step 431). If the digital information itself is within the push notification, e.g., is of a sufficiently small size to be accepted by the Global Push Notification Server or third-party push notification service, or if the family device B is in the LAN environment of the embedded device, then the digital information may be displayed (step 431). For example, sharing module 136 of family device B 130-B illustrated in FIG. 1 may include a GUI that causes display device 139 to display the received digital information.

However, if the push notification included a description of or a link to the digital information rather than the digital information itself, e.g., if the digital information was too large to be accepted by the Global Push Notification Server or third-party push notification service, and family device B is not in the LAN environment of the embedded device, then method 400 continues on the mobile device side with exemplary family device B requesting the digital information from the embedded device responsive to the push notification (step 432). For example, if the push notification included a description of the digital information, then the GUI of sharing module 136 of family device B 130-B illustrated in FIG. 1 may cause display device 139 to display a screen via which the user may access and navigate the contents of an internal storage device or external storage device 171 connected to embedded device 110 so as to locate the information and then to request the information from the embedded device. Or, for example, if the push notification included a link to the digital information, then sharing module 136 automatically may select the link so as to request the information from the embedded device, or the user may select the link so as to request the information from the embedded device. Note that such a request for the digital information need not be made immediately after the family device B receives the notification, but may be made at any suitable or convenient time for the user or the family device. Indeed, the family device B need not necessarily ever request the digital information from the embedded device. However, as described below with reference to FIG. 5, in some embodiments the embedded device may store rules that cause the embedded device to transfer the digital information to the family device B at a later time if the family device connects to the embedded device and that information had not yet been retrieved.

Method 400 continues on the embedded device side with the family cloud application retrieving the digital information from the storage device and transmitting the digital information to exemplary family device B responsive to the received request from that device (step 425). For example, sharing module 115 illustrated in FIG. 1 may receive the request, and responsive to the request may access external storage device 171 via an I/O port or an internal storage device, may retrieve the digital information from the internal or external device, and may transmit the digital information to family device B 130-B.

On the mobile device side, e.g., at family device B, the family application then receives the digital information from the embedded device and displays it to the family member (step 433). For example, sharing module 136 illustrated in FIG. 1 preferably includes a GUI that causes display device 139 to display the digital information to the family member.

Note that although method 400 is described with reference to the digital information originating at admin device A and being received at family device B, it should be understood that the steps of the method suitably may be modified to permit any mobile device enrolled in the family cloud to share digital information with the other mobile devices enrolled in the family cloud in a manner analogous to that illustrated in FIG. 4.

Figure 5A:
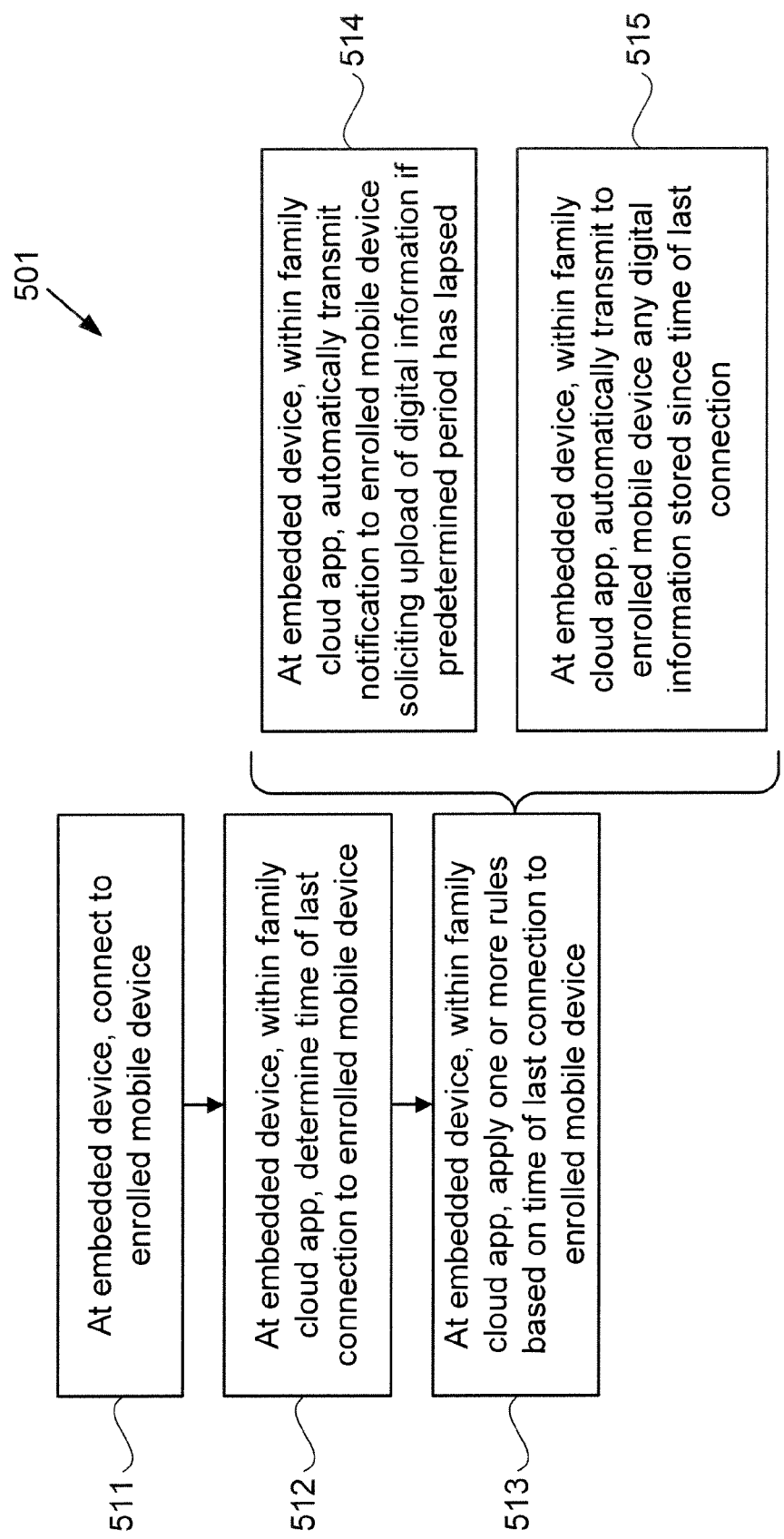

Additionally, the embedded device may facilitate or control the sharing of information via the family cloud based on one or more rules therein, e.g., rules 1 . . . M 118 within family cloud application 113 stored in computer-readable medium 112 of embedded device 110 illustrated in FIG. 1. For example, FIG. 5A illustrates steps executed by a embedded device during an exemplary method 501 for soliciting digital information from or transmitting information to an enrolled mobile device, e.g., admin device A or any of family devices B . . . N 130-B . . . N, based on rules within the embedded device relating to the time of the mobile device's last connection to the embedded device. Method 501 may begin with connecting to the enrolled device at the embedded device (step 511). Such a connection may be made in any suitable manner, such as via a direct Wi-Fi connection between the mobile device and embedded device 110; via a Wi-Fi connection between the mobile device and a different embedded device and through the Internet based on the WAN IP address of embedded device 110; or through a connection between the mobile device and a cellular data network such as 3G or 4G and through the Internet based on the WAN IP address of embedded device 110.

Method 501 may continue with the embedded device, within the family cloud application, determining the time of its last connection to the enrolled mobile device (step 512). For example, one of the rules 1 . . . M 118 illustrated in FIG. 1 may cause sharing module 115 within family cloud application 113 to store within computer-readable medium 112 the most recent time at which the enrolled mobile device connected to the embedded device, or even a log of times at which the enrolled mobile device connected to the embedded device. Another of the rules 1 . . . M 118 illustrated in FIG. 1 may cause sharing module 115 to determine the time of the enrolled device's last connection based on such stored information, upon the connection of that device to the embedded device in step 511.

Method 501 further includes the embedded device, within the family cloud application, applying one or more rules based on the time of last connection to the enrolled mobile device (step 513). In one example, within the family cloud application, the embedded device automatically may transmit a notification to the enrolled mobile device soliciting upload of digital information if a predetermined period has lapsed (step 514). For example, one of the rules 1 . . . M 118 may cause sharing module 115 to determine the period between the present time and the time of the enrolled device's last connection, to compare that period to a predetermined period stored within computer-readable medium 112, and to transmit the notification to the enrolled mobile device if the period is greater than the predetermined period. The predetermined period may be a day, a week, or a month, or other suitable value that may be preprogrammed or may be selected by the administrator via a suitable GUI generated by sharing module 126 of admin device A 120. The notification may tell the user that they have not connected to the embedded device for more than that predetermined period, and ask the user whether he would like to share any digital information obtained during that period, e.g., may say something to the effect of, "You have not connected to the family cloud for more than one week. Do you have any photos or videos to share?" Responsive to the notification, the user may select and transmit digital information to the embedded device, and the embedded device may share that digital information with other enrolled devices, in a manner analogous to that described above with reference to FIG. 4.

In another example, within the family cloud application, the embedded device automatically may transmit to the enrolled mobile device any digital information stored within the internal or external storage device since the time of last connection (step 515). For example, although the push module of the embedded device may send push notifications of digital information to any enrolled devices, as described above with reference to FIG. 4, it may be the case that the enrolled mobile device connecting to the embedded device in step 511 had not yet retrieved that digital information from the embedded device. One of the rules 1 . . . M 118 may cause sharing module 115 to determine whether any digital information has been stored within the internal or external storage device since the time of the enrolled device's last connection to the embedded device. If so, then the rule may cause sharing module 115 to transmit that digital information to the enrolled mobile device via the connection established in step 511. Accordingly, the enrolled mobile device or the user thereof need not necessarily proactively retrieve digital information from the embedded device. That is, steps 432 and 425 of method 400 illustrated in FIG. 4 need not necessarily be executed for the embedded device to transmit to the mobile device digital information, particularly digital information that is too large to be sent via the Global Push Notification Server or third-party push notification service.

Other types of rules for facilitating sharing digital information between family devices enrolled to the family cloud may be envisioned. For example, FIG. 5B illustrates steps executed by a embedded device during an exemplary method 502 for transmitting information to an enrolled mobile device, e.g., admin device A or any of family devices B . . . N 130-B . . . N, based on rules within the embedded device relating to the present location of the mobile device. Method 502 illustrated in FIG. 5B may facilitate the sharing and enjoyment of digital information among enrolled mobile devices by sending information that may remind the users thereof of an earlier trip to the same location.

Method 502 may begin with connecting to the enrolled device at the embedded device (step 521). Such a connection may be made in any suitable manner, such as via a direct Wi-Fi connection between the mobile device and embedded device 110; via a Wi-Fi connection between the mobile device and a different embedded device and through the Internet based on the WAN IP address of embedded device 110; or through a connection between the mobile device and a cellular data network such as 3G or 4G and through the Internet based on the WAN IP address of embedded device 110.

Method 502 may continue with the embedded device, within the family cloud application, determining the present location of the enrolled mobile device (step 522). For example, one of the rules 1 . . . M 118 illustrated in FIG. 1 may cause sharing module 115 within family cloud application 113 to determine the present location of the enrolled mobile device based on the connection established in step 521. Information about the device's present location, such as the device's global positioning system (GPS) coordinates, automatically may be transferred to the embedded device during connection step 521, and indeed the sharing module 126 or 136 within the mobile device may be configured to provide such location information automatically when connecting to the embedded device. Alternatively, one or the rules 1 . . . M 118 may cause sharing module 115 to request such location information from the enrolled mobile device, and sharing module 126 or 136 may be configured to respond to such a request by providing the mobile device's present location.

Method 502 continues with the embedded device, within the family cloud application, applying one or more rules based on the present location of the enrolled mobile device (step 523). In one illustrative example, within the family cloud application, the embedded device automatically may transmit to the enrolled mobile device any digital information stored within the internal or external storage device relating to the present location of the mobile device (step 524). One of the rules 1 . . . M 118 may cause sharing module 115 to determine whether any digital information that is stored within the internal or external storage device relates to the present location of the mobile device. For example, the internal or external storage device may store, along with the digital information itself, locations respectively associated with the digital information. Such locations may be associated with the digital information because a user had tagged the digital information with metadata describing the location at which the digital information was obtained using techniques known in the art; or because the device used to obtain the digital information automatically tagged the digital information with such metadata, e.g., the device was a digital camera programmed to tag digital images with metadata containing the GPS coordinates of the camera at the time the images are obtained; or because the sharing module 126 or 136 of the mobile device is configured to tag the digital information with metadata describing the location of the mobile device at the time the mobile device transmits the digital information to the embedded device for sharing in accordance with method 400 of FIG. 4; or by any other suitable method.

If sharing module 115 determines that any digital information stored within the internal or external storage device relates to the present location of the enrolled mobile device, e.g., includes metadata describing a location that is sufficiently close to the device's present location, then the rule may cause sharing module 115 to transmit all or a subset of digital information to the enrolled mobile device via the connection established in step 521. A definition of what may be a "sufficiently close" location, and whether to transmit all or only a subset of the digital information, may be preprogrammed or may be selected by the administrator via a suitable GUI generated by sharing module 126 of admin device A 120. Preferably, such a GUI also may permit the admin device A 120 to exclude the mobile device's usual locations from the rule, e.g., the user's home, work place, and daily travel route, and to define how many items of digital information should be sent, so that the user may not continually receive digital information relating to such locations, and may not receive a large volume of digital information, but preferably receives only one or a low number of items of digital information and only for less-frequently visited locations, such as vacation destinations.

The digital information may be transmitted during step 524 using a push notification such as described above with reference to FIG. 4, subsequent to which the mobile device may request the digital information; or may be transmitted via a direct Wi-Fi connection between the mobile device and embedded device 110; via a Wi-Fi connection between the mobile device and a different embedded device and through the Internet; or through a connection between the mobile device and a cellular data network such as 3G or 4G and through the Internet. Accordingly, the digital information may be transferred to the enrolled mobile device at a time that is not necessarily related to the time at which the digital information initially was transmitted to or stored by the embedded device during method 400 illustrated in FIG. 4.

Indeed, digital information may be shared among enrolled mobile devices based on any suitable rule relating to the present time. For example, FIG. 5C illustrates steps executed by a embedded device during an exemplary method 503 for transmitting information to an enrolled mobile device, e.g., admin device A or any of family devices B . . . N 130-B . . . N, based on rules within the embedded device relating to the present time. Method 503 illustrated in FIG. 5C may facilitate the sharing and enjoyment of digital information among enrolled mobile devices by sending information that may remind the users thereof of an earlier time or event that relates to the present time.

Method 503 may begin with the embedded device, within the family cloud application, determining the time (step 531). For example, one of the rules 1 . . . M 118 illustrated in FIG. 1 may cause sharing module 115 within family cloud application 113 to determine the present time, e.g., by accessing a system clock within embedded device 110.

Method 503 continues with the embedded device, within the family cloud application, applying one or more rules based on the present time (step 532). In one illustrative example, within the family cloud application, the embedded device automatically may transmit to the enrolled mobile device any digital information stored within the internal or external storage device obtained at a fixed time previous to the present time (step 533). One of the rules 1 . . . M 118 may cause sharing module 115 to determine whether any digital information that is stored within the internal or external storage device was obtained at a predetermined time previous to the present time, e.g., one week, one month, one year, two years, five years, ten years, or any other suitable amount of time previous to the present time. If sharing module 115 determines that any digital information stored within the storage device was obtained at the predetermined time previous to the present time, e.g., was obtained one week, one month, one year, two years, five years, or ten years previous to the present time, then the rule may cause sharing module 115 to transmit all or a subset of that digital information to the enrolled mobile device via the connection established in step 531. A definition of the predetermined time may be preprogrammed or may be selected by the administrator via a suitable GUI generated by sharing module 126 of admin device A 120. Preferably, such a GUI may permit the admin device A 120 to define how many items of digital information should be sent, so that the user may not receive a large volume of digital information, but preferably receives only one or a low number of items of digital information that may remind the user of an earlier time.

The digital information may be transmitted during step 524 using a push notification such as described above with reference to FIG. 4, subsequent to which the mobile device may request the digital information; or may be transmitted via a direct Wi-Fi connection between the mobile device and embedded device 110; via a Wi-Fi connection between the mobile device and a different embedded device and through the Internet; or through a connection between the mobile device and a cellular data network such as 3G or 4G and through the Internet. Accordingly, the digital information may be transferred to the enrolled mobile device at a time that is not necessarily related to the time at which the digital information initially was transmitted to or stored by the embedded device during method 400 illustrated in FIG. 4.

In another illustrative example, within the family cloud application, the embedded device automatically may transmit to the enrolled mobile device any digital information stored within the internal or external storage device relating to an upcoming event (step 534). One of the rules 1 . . . M 118 may cause sharing module 115 to determine whether any digital information that is stored within the internal storage device or external storage device 171 relates to an upcoming event, such as a holiday, anniversary, or birthday. For example, the storage device may store, along with the digital information itself, descriptions of events respectively associated with the digital information. Such descriptions of events may be associated with the digital information because a user had tagged the digital information with metadata describing the event associated with the digital information using techniques known in the art; or because the sharing module 126 or 136 of the mobile device is configured to prompt the user to tag the digital information with metadata describing the location of the mobile device at the time the mobile device initially obtains the digital information or at the time that it transmits the digital information to the embedded device for sharing in accordance with method 400 of FIG. 4; or by any other suitable method. Such metadata may contain the term "holiday," "anniversary" or "birthday" or another term relating to an event, and may include the name of a friend or family member, e.g., "Suzie's birthday." One or more of the rules 1 . . . M 118 may cause sharing module 115 to compare such terms to words that may appear in entries within the user's calendar, which may be among the digital information stored on an internal storage device or external storage device 171, and to determine whether the term matches the word and the date of the entry within the user's calendar is on the present date or is approaching (e.g., is one week or one day from the present date). That is, sharing module 115 may determine by such a method, or by any other suitable method, that an event is on an upcoming date or on the present date, and that digital information stored within the storage device relates to a prior occurrence of that event.

If sharing module 115 determines that any digital information stored within the internal or external storage device relates to the upcoming event, then the rule may cause sharing module 115 to transmit all or a subset of that digital information to the enrolled mobile device via the connection established in step 531. A definition of events for which to perform such transmission may be preprogrammed or may be selected by the administrator via a suitable GUI generated by sharing module 126 of admin device A 120. Preferably, such a GUI may permit the admin device A 120 to define how many items of digital information should be sent, so that the user may not receive a large volume of digital information, but preferably receives only one or a low number of items of digital information that may remind the user of an earlier event.

The digital information may be transmitted during step 534 using a push notification such as described above with reference to FIG. 4, subsequent to which the mobile device may request the digital information; or may be transmitted via a direct Wi-Fi connection between the mobile device and embedded device 110; via a Wi-Fi connection between the mobile device and a different embedded device and through the Internet; or through a connection between the mobile device and a cellular data network such as 3G or 4G and through the Internet. Accordingly, the digital information may be transferred to the enrolled mobile device at a time that is not necessarily related to the time at which the digital information initially was transmitted to or stored by the embedded device during method 400 illustrated in FIG. 4.

Figure 5D:
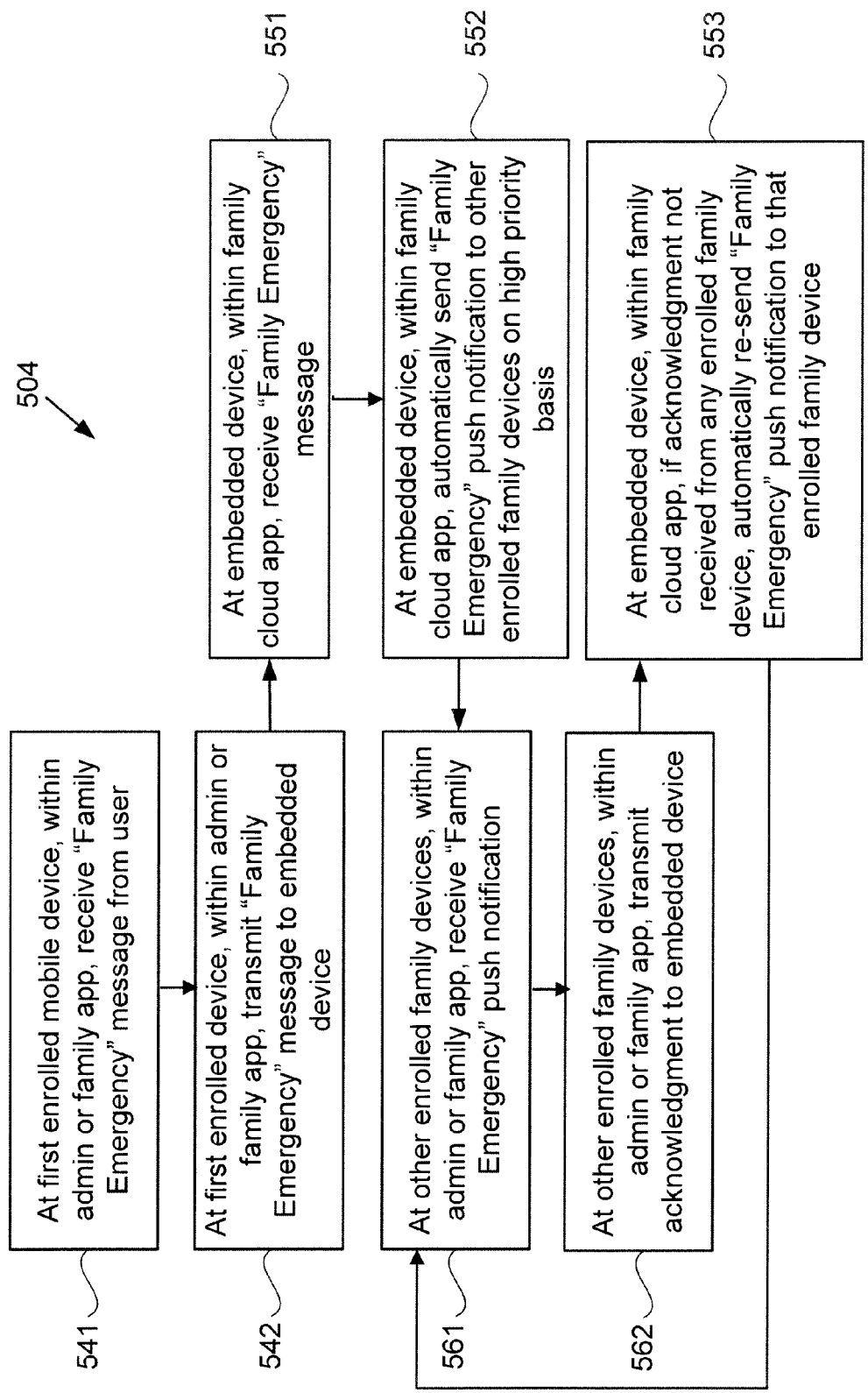
FIG. 5D illustrates steps executed by an embedded device and by mobile devices during an exemplary method for sharing digital information between the mobile devices using a family cloud.

The family cloud further may permit mobile devices to share information with one another on a high priority basis. For example, if there is a family emergency such as an accident, a security breach, or a fire, the present embedded device may facilitate the rapid sharing of messages among the mobile devices relating to such an emergency. FIG. 5D illustrates steps executed by an embedded device and by mobile devices during an exemplary method 504 for sharing digital information on a high priority basis using a family cloud.

On the mobile device side, method 504 begins with the admin or family application at a first enrolled mobile device receiving a "Family Emergency" message from the user (step 541). For example, sharing module 126 of admin device A and sharing module 136 of family devices B . . . N 130-B . . . 130-N each preferably includes a GUI that may be displayed on display device 129 of admin device A 120, and that includes a button prompting the user of that device to indicate a "Family Emergency." Upon the user's selection of that button via a user input device on the mobile device, the GUI may display a field prompting the user to enter text describing the family emergency, e.g., "I hear someone trying to break in." Preferably, based on the use of the "Family Emergency" button, sharing module 126 or 136 automatically includes within the message the name and location of the mobile device's user, and an indication that there is an emergency. The admin application or family application then may transmit the message to the embedded device (step 542). For example, sharing module 126 or 136 may initiate a connection to the embedded device in a manner such as described above, and may transmit the indication to the embedded device via such a connection.

On the embedded device side, method 504 continues with the embedded device receiving the "Family Emergency" message within the family cloud application (step 551). For example, sharing module 115 may receive the message, and based on one or more of rules 1 . . . M 118 may determine from the content of the message, e.g., from the indication within the message, that there is an emergency and that therefore the other enrolled devices should be notified of the emergency on a high priority basis. The embedded device then automatically may send a "Family Emergency" push notification to the other enrolled family devices on a high priority basis (step 552). For example, push module 116 may prepare and send a "Family Emergency" push notification to Global Push Notification Server 180, optionally via a third party push notification service, and internally may prioritize the preparation and sending of that notification above other push notifications that may relate to other types of digital information to be shared on the family cloud. The push notification preferably includes the text entered by the user, the user's name and location, and an indication that there is a "Family Emergency." Note that if any of the other enrolled family devices are in the LAN environment of the embedded device, then the embedded device instead may send the "Family Emergency" notification using a direct message, rather than a push notification.

Returning to the mobile device side, method 500 continues with the other enrolled family devices receiving, within the admin or family application, the "Family Emergency" push notification (step 561). For example, sharing module 126 of admin device 120 and sharing module 136 of family devices B . . . N 130-B . . . N illustrated in FIG. 1 may include a GUI that causes display device 139 to display the content of the push notification in such a manner as to quickly alert the user that their attention to the emergency may be required. Preferably, the other enrolled family devices, within the admin or family application, transmit an acknowledgment of receipt to the embedded device (step 562). Accordingly, if any of the other enrolled family devices do not receive the "Family Emergency" push notification at step 561, then they may not transmit an acknowledgment of receipt to the embedded device.

Then, if the family cloud application of the embedded device does not receive an acknowledgment from any of the enrolled family devices, then the application preferably re-sends the "Family Emergency" push notification to that enrolled family device (step 553), following which steps 561, 562, and 553 may repeat as needed until that enrolled family device transmits an acknowledgment to the embedded device. Note that the family cloud application of the embedded device optionally may be configured to re-send the "Family Emergency" push notification to an unresponsive enrolled family device a limited number of times, e.g., five times, or ten times, or more. It also should be understood that method 504 illustrated in FIG. 5D suitably may be modified so as rapidly to distribute any type of message among enrolled family devices, and that the messages need not necessarily pertain to emergencies. However, method 504 may provide a particularly useful way of rapidly bringing emergencies to the attention of family members, friends, and the like.

It should be appreciated that the various above-described rule-based actions that may be taken by the embedded device are intended to be purely illustrative, and not limiting. Other rules may be envisioned, and such rules optionally may be omitted.

Methods of Maintaining Communication with Mobile Devices

As noted above, mobile devices enrolled to the family cloud may communicate with the embedded device via a direct Wi-Fi connection between the mobile device and the embedded device in a LAN environment; via a Wi-Fi connection between the mobile device and a different embedded device and through the Internet based on the WAN IP address of the embedded device; or through a connection between the mobile device and a cellular data network such as 3G or 4G and through the Internet based on the WAN IP address of the embedded device. For connecting via Wi-Fi in a LAN environment, the embedded device's ESSID and the access credential for use in connecting to the embedded device may be provided to the mobile device during enrollment to the family cloud. Analogously, for connecting via the Internet, e.g., via a different embedded device or via a cellular data network, the embedded device's WAN IP address for use in connecting to the embedded device may be provided to the mobile device during enrollment to the family cloud.

However, as is known in the art, internet service providers (ISPs) such as ISP 170 illustrated in FIG. 1 may dynamically assign WAN IP addresses to network devices such as gateways, so as to save limited numbers of static WAN IP addresses. Accordingly the WAN IP address of embedded device 110 may change from time to time. Unless informed of such a change, the family devices enrolled to that embedded device's family cloud may be unable to connect to the embedded device via the Internet because they would not know the embedded device's new WAN IP address. Although services based on the known dynamic domain name system (DDNS) potentially may be used to inform mobile devices of the embedded device's new WAN IP address, e.g., in which the mobile devices use a domain name to retrieve a new WAN IP address from a DDNS server, a simpler method based on the embedded device's push notification functionality instead may be used to maintain communication between the embedded device and mobile devices.

Figure 6:
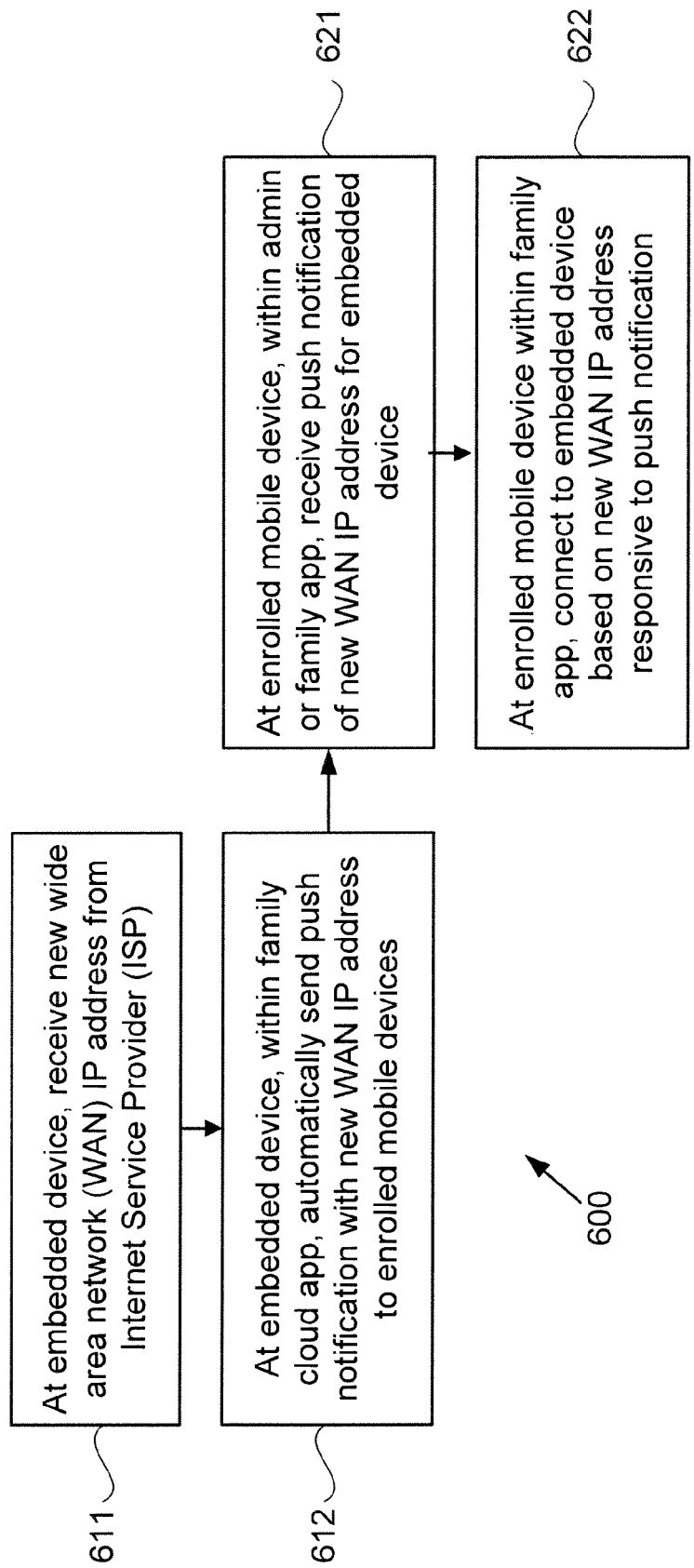
FIG. 6 illustrates steps executed by an embedded device and by mobile devices during an exemplary method for maintaining a family cloud after the embedded device receives a new wide area network (WAN) internet protocol (IP) address.

Specifically, FIG. 6 illustrates steps executed by an embedded device and by mobile devices during an exemplary method 600 for maintaining a family cloud after the embedded device receives a new WAN IP address. On the embedded device side, method 600 begins with the embedded device receiving a new WAN IP address from an ISP (step 611). For example, ISP 170 to which embedded device 110 is connected periodically may assign a new WAN IP address to the embedded device, of which the embedded device may become aware using known techniques.

The embedded device then, within the family cloud application, automatically may send a push notification with the new WAN IP address to enrolled mobile devices (step 612). For example, the push notification may include a link based on HTML code for use in causing the enrolled device to configure itself appropriately so as to connect to the embedded device based on the new WAN IP address.

On the mobile device side of method 400, the enrolled mobile device then may receive the push notification of the new WAN IP address for the embedded device (step 621), and may connect to the embedded device based on the new WAN IP address responsive to the push notification (step 622). Such a connection may be established analogously as during the enrollment process described further above with reference to FIG. 3. The mobile devices then may continue to communicate with the embedded device, and may share digital information using the family cloud of that embedded device, based on the new WAN IP address.

Note that other methods for maintaining communication between embedded devices and mobile devices alternatively suitably may be used, such as based on DDNS. As is known in the art, DDNS is a service that maps Internet domain names to WAN IP addresses. The DDNS service may monitor the WAN IP address of a network device, and if the WAN IP address of the device changes, the DDNS service may update the mapping of the Internet domain name to the new WAN IP address. Accordingly, maintaining communication with the first and second mobile devices may include the first and second mobile devices retrieving the new embedded device WAN IP address from a dynamic domain name system (DDNS) server.

Multiple Embedded Device-Based Systems and Methods

As mentioned above and as described in greater detail below with reference to FIGS. 7-10, two or more embedded devices such as that illustrated in FIG. 1 may be networked together via the Internet so as to provide a merged family cloud that may facilitate mobile devices sharing digital information with one another to an even greater extent. Such embedded devices preferably are LAN-based, e.g., are configured to provide LAN environments such as Wi-Fi connections to mobile devices within range, and preferably also have WAN IP addresses so that devices outside of the LAN environment may access the embedded devices upon presentation of a suitable access credential.

Figure 7:
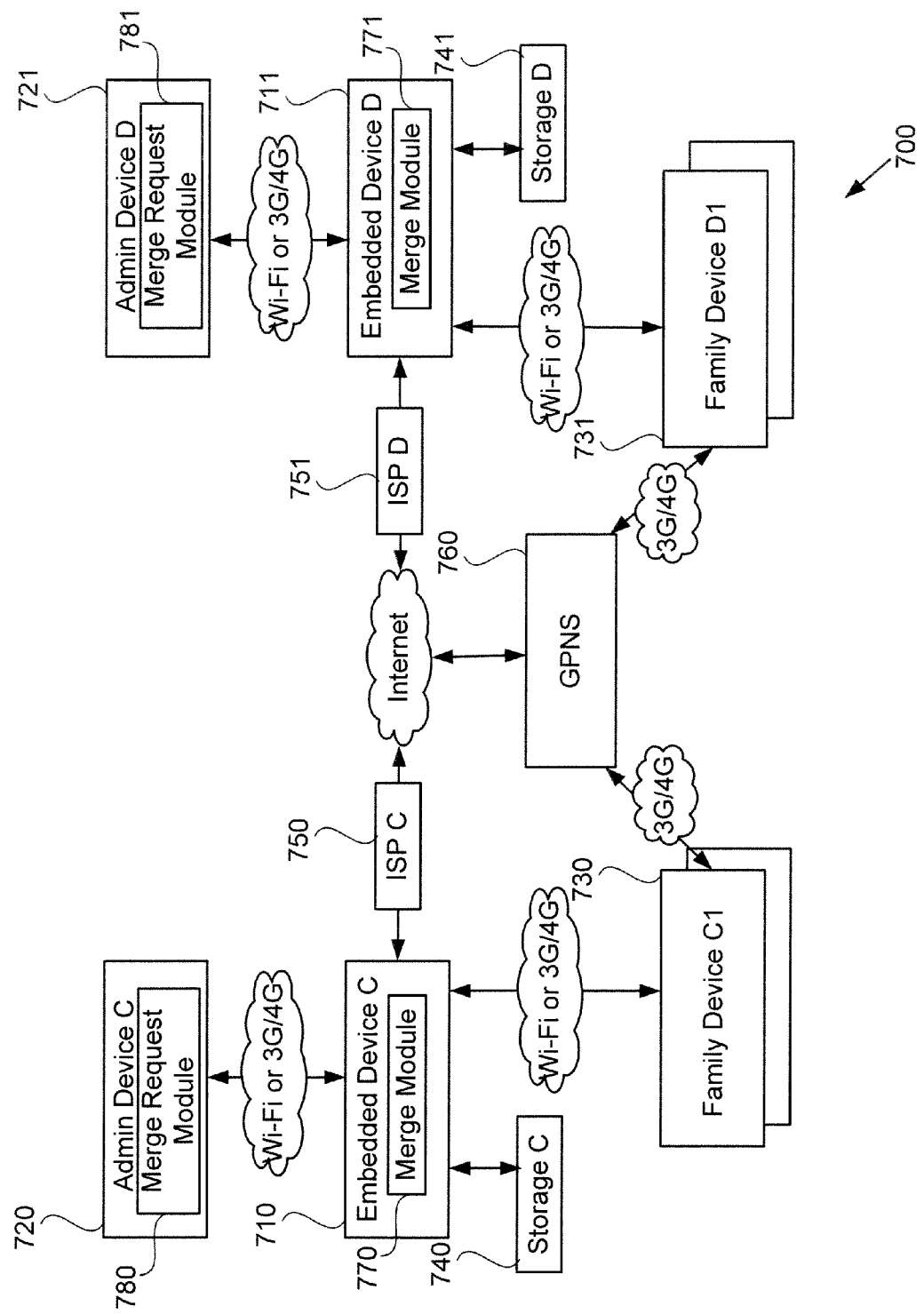
FIG. 7 illustrates an exemplary multiple embedded device-based system for providing a merged family cloud for sharing digital information between mobile devices.

Specifically, FIG. 7 illustrates an exemplary system 700 that includes a first embedded device C 710 and a second embedded device D 711, although should be appreciated that system 700 may include any suitable number of embedded devices connected to one another in a manner analogous to that of embedded device C 710 and embedded device D 711. Embedded device C 710 is connected to admin device C 720, to one or more family devices C1 730, to external storage 740 (internal storage not illustrated), to ISP 750, and to Global Push Notification Server (GPNS) 760, optionally via a third-party notification service (not illustrated), each of which components may be configured analogously as described above with reference to FIG. 1. Similarly, embedded device D 711 is connected to admin device D 721, to one or more family devices D1 731, to external storage 741 (internal storage not illustrated), to ISP 751, and to GPNS 760, optionally via a third-party notification service (not illustrated), each of which components may be configured analogously as described above with reference to FIG. 1. Additionally, embedded device C and D 710, 711 each respectively may include a merge module 770, 771, and admin devices C and D 720, 721 each respectively may include a merge request module 780, 781. Merge modules 770, 771 and merge request modules 780, 781 preferably are configured to facilitate networking of embedded devices C and D with one another and the merging of the embedded devices' respective family clouds, as now will be described with reference to FIGS. 8A-8E. It should be appreciated that any suitable number of embedded devices and mobile devices may be networked together using the principles provided herein.

Figure 8A:
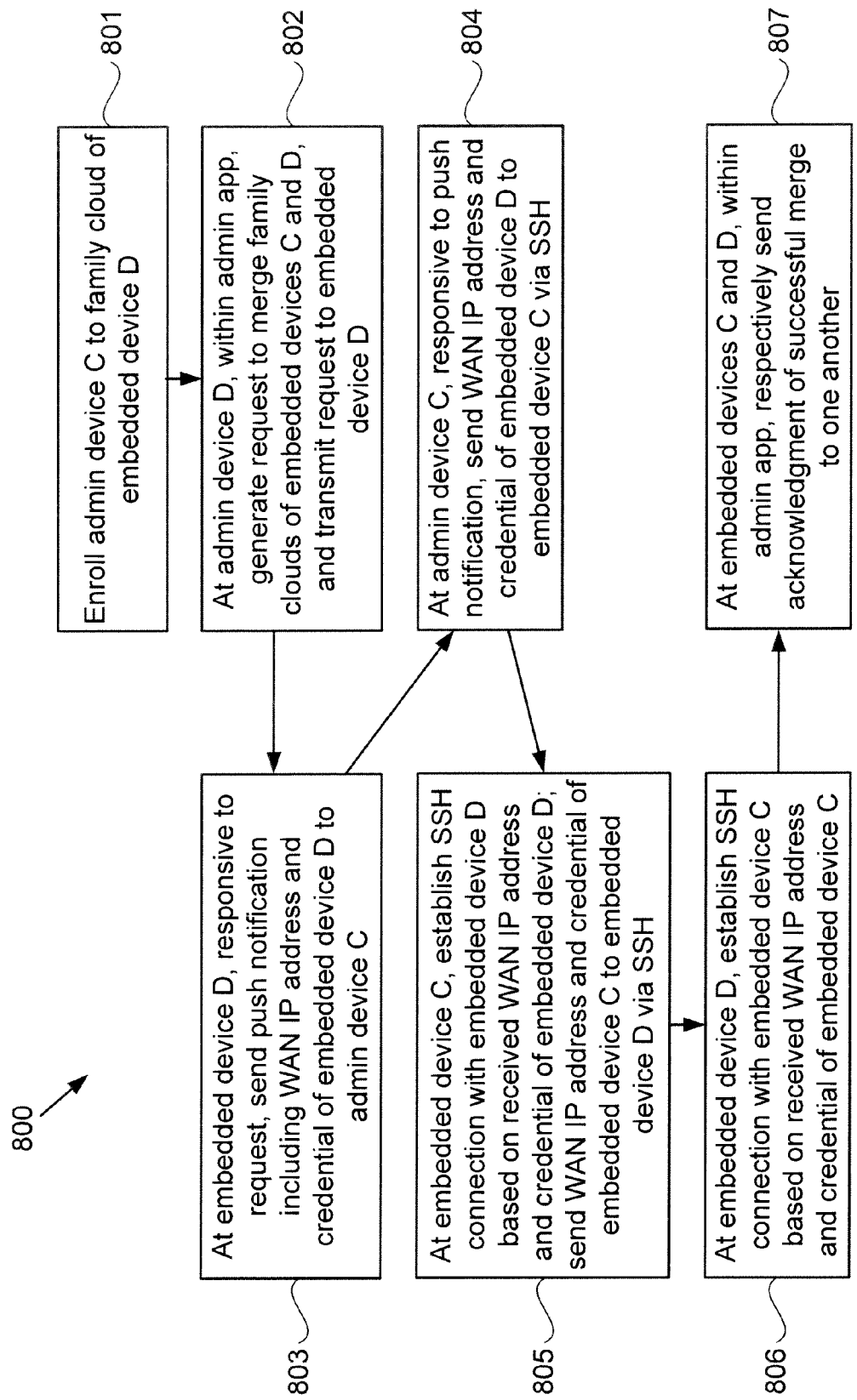

FIG. 8A illustrates steps in an exemplary method 800 executed at first and second mobile devices and at first and second LAN-based embedded devices to establish secure connections via which they may share digital information with one another. Method 800 includes enrolling admin device C to the family cloud of embedded device D (step 801), e.g., in the manner described above with reference to FIG. 3. Preferably, admin device C is enrolled as the administrator for embedded device C, and is enrolled as a family member for embedded device D, and thus may communicate securely (e.g., via SSH) with embedded devices C and D; and admin device D is enrolled as the administrator for embedded device D, and thus may communicate securely (e.g., via SSH) with embedded device D. Accordingly, embedded device D stores the identifiers for both of admin devices C and D, and admin device C stores the WAN IP addresses and respective access credentials for both of embedded devices C and D. Preferably, the users of admin devices C and D agree with one another to merge the family clouds of the embedded devices for which they are administrators. For example, the user of admin device C may request to join the family cloud of embedded device D, e.g., via email, telephone, text messaging, or the like and the user of admin device D agrees, or the user of admin device D likewise may invite the user of admin device C to join the family cloud of embedded device D and the user of admin device C agrees.

Method 800 illustrated in FIG. 8A continues with admin device D, within the admin app, generating a request to merge the family clouds of embedded devices C and D (step 802), e.g., upon user selection of a suitable button within a GUI generated by merge request module 781 illustrated in FIG. 7. Merge request module 781 of admin device D then transmits the request to embedded device D.

Referring again to FIG. 8A, responsive to the request received from admin device D, embedded device D sends a push notification including the WAN IP address of embedded device D to admin device C, as well as an access credential for embedded device C to use to securely connect to embedded device D (step 803). Admin device C, responsive to the push notification, then sends the WAN IP address and credential of embedded device D to embedded device C via an SSH connection (step 804).

Embedded device C then may establish an SSH connection with embedded device D based on the received WAN IP address and access credential, and then may send the WAN IP address and access credential of embedded device C to embedded device D via SSH (step 805). For example, merge module 770 of embedded device C 710 may transmit the WAN IP address and access credential of embedded device C to merge module 771 of embedded device D via such an SSH connection.

Embedded device D then may establish an SSH connection with embedded device C based on the received WAN IP address and credential of embedded device C (step 806), thus resulting in a secure bidirectional communication pathway between embedded devices C and D via which mobile devices respectively enrolled to the clouds of the embedded devices may share digital information with one another. Preferably, embedded devices C and D, within the admin application, respectively send an acknowledgment of the successful merge to one another (step 807).

Figure 8B:
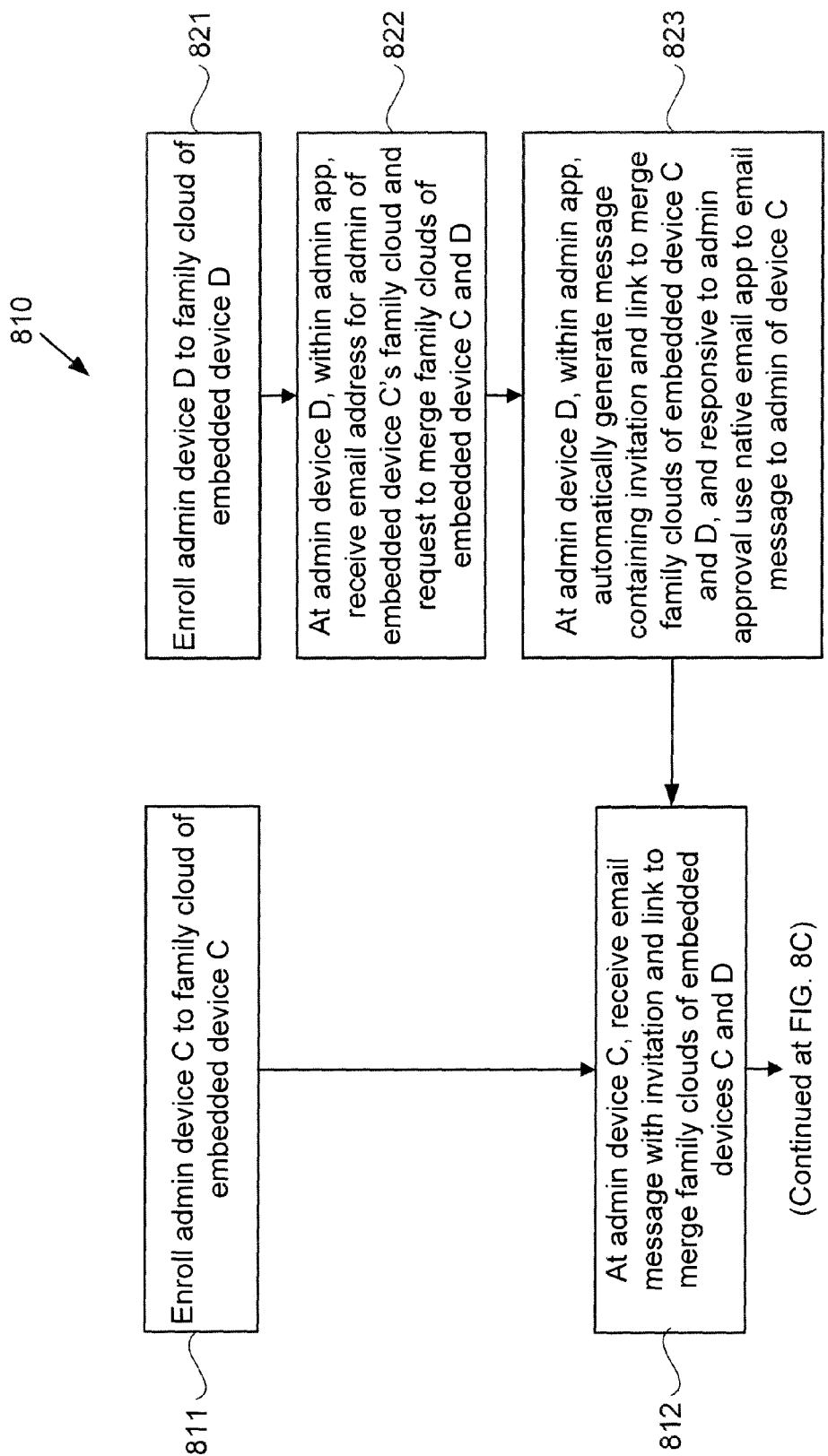
Figure 8D:
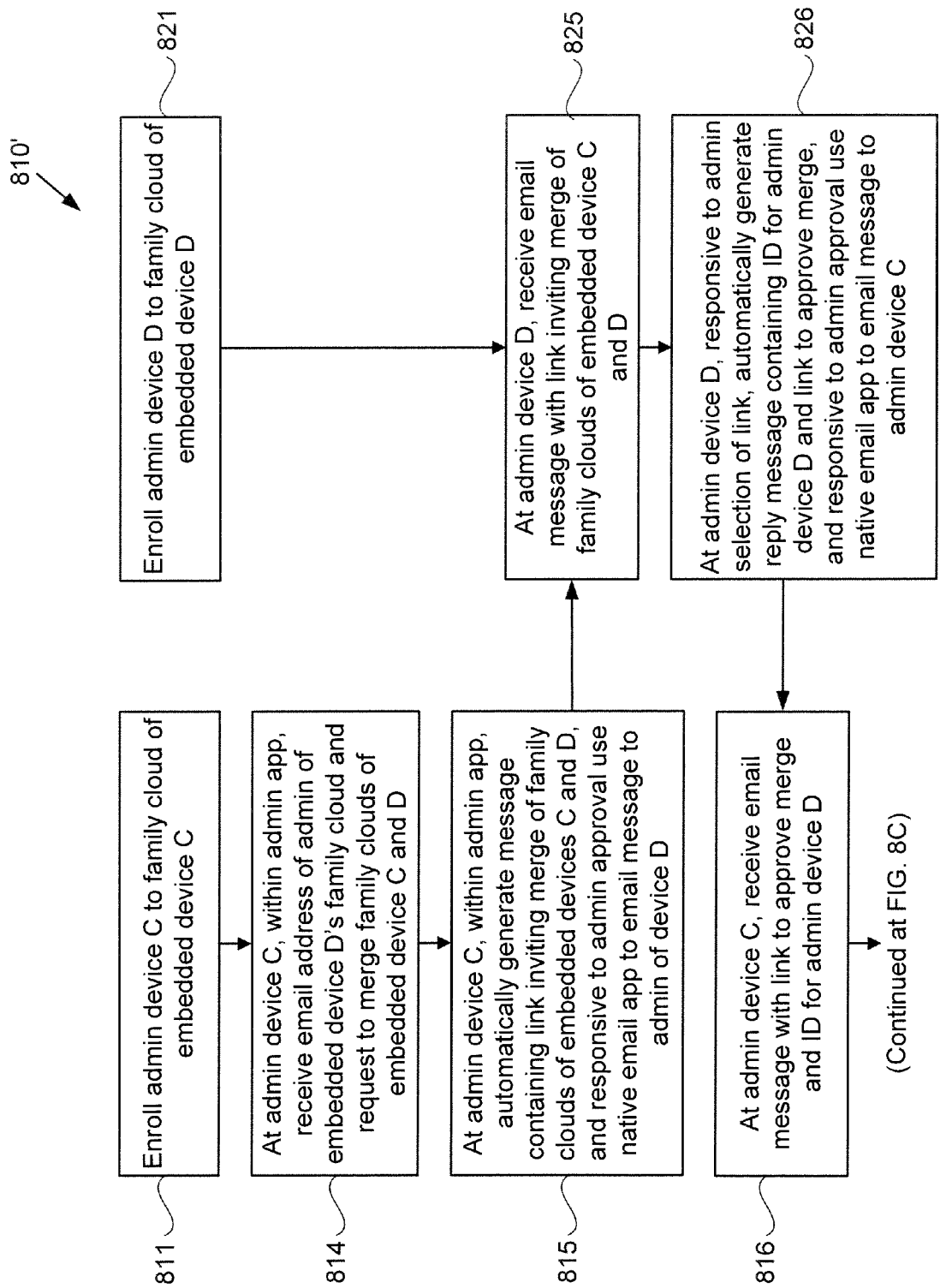

Note that in other embodiments, a mobile device need not necessarily be previously enrolled to a given embedded device in order to merge the family cloud of that embedded device with the family cloud of another embedded device. For example, FIG. 8B illustrates steps executed by first and second mobile devices during an alternative exemplary method 810 for initiating the merge of the family clouds of first and second embedded devices. Specifically, method 810 begins on the side of a first mobile device, e.g., admin device C 720 illustrated in FIG. 7, by enrolling that device to the family cloud of a first embedded device, e.g., embedded device C 710 (step 811). At the same time, or more likely at an earlier or later time, method 810 continues on the side of a second mobile device, e.g., admin device D 721 illustrated in FIG. 7, by enrolling that device to the family cloud of a second embedded device, e.g., embedded device D 711 (step 821). Exemplary methods of enrolling admin devices to family clouds are described above with reference to FIG. 2. Note that steps 811 and 821 may occur well before the remaining steps of method 810; that is, the family clouds of embedded devices C and D may be established for any suitable amount of time before the family clouds of those two embedded devices are merged.

Method 810 further includes, at the second mobile device side, receiving within the admin application of admin device D the email address for the admin of embedded device C's family cloud (that is, the user of admin device C) and a request to merge the family clouds of embedded devices C and D (step 822). For example, merge request module 781 of admin device D 721 illustrated in FIG. 7 preferably includes a GUI that may be displayed on the display device (not specifically illustrated) of admin device D 721, and that includes a button prompting the administrator of that device to invite the administrator of another family cloud to merge family clouds. Upon the administrator's selection of that button via a user input device (not specifically illustrated), e.g., a touch screen on the admin device D, the GUI may display a field prompting the user to type in the email address of the administrator to be invited using the input device, or an interface permitting the administrator to select an email address from a contact list or address book stored on admin device D, using the user input device.

Method 810 illustrated in FIG. 8B may continue on the mobile device side by automatically generating, within the admin application on admin device D, a message that contains an invitation and a link to merge the family clouds of embedded devices C and D (step 823). Preferably, the admin application generates such a message using a native email application within admin device D, and the email is sent to admin device C responsive to administrator approval (step 823). For example, merge request module 781 illustrated in FIG. 7 may generate the message with link within a native email application (not specifically illustrated) on admin device D 721, and the administrator may approve and send the message by clicking "send" within the native email application. The merge request module 781 may generate the link based on HTML code that includes the ID for admin device D for embedded device C's use in merging the family clouds of embedded devices C and D. The admin device D then may send the email to admin device C via an appropriate communications channel, e.g., via a Wi-Fi connection to embedded device D 711 and via ISP 751 to the Internet; via a Wi-Fi connection to a different embedded device and through the Internet; or through a cellular data connection such as 3G or 4G and through the Internet. Note that for step 823, a Wi-Fi connection to embedded device D may be used if admin device D is in the LAN environment of embedded device.

Method 810 continues on the side of a first mobile device, specifically admin device C, at which a native email application therein receives the email message with the invitation to merge the family clouds of embedded devices C and the link to download the family application from an online app store (step 812). For example, a native email application on admin device C 720 may display the email to the family member and may prompt the administrator to select the link using an input device.

FIG. 8C illustrates steps executed by first and second mobile devices and by first and second embedded devices during an exemplary method 811 for completing the merge of the family clouds of the first and second embedded devices following the initiation of such a merge in method 810 illustrated in FIG. 8B.

Specifically, method 811 illustrated in FIG. 8C continues from step 812 illustrated in FIG. 8B at the first mobile device, specifically within admin device C, in which the admin application transmits to embedded device C a request to merge with the cloud of embedded device D responsive to the administrator's selection of the link (step 813). For example, the HTML code within the link may cause merge request module 780 of admin device C 720 to transmit to embedded device C 710 the ID for admin device D, which the embedded device C may interpret as an instruction to merge with the cloud of embedded device D, and to communicate with admin device D to do so.

On the side of the first embedded device, specifically embedded device C, method 810 continues with the embedded device C, from within the family cloud application, sending a push notification including an access credential for embedded device D to access embedded device C and the WAN IP address of embedded device C to admin device D responsive to the received request to merge (step 831). For example, embedded device C 710 may send its own WAN IP address and access credential (such as a login and password or encryption key) to admin device D 721, in the form of a push notification. In one illustrative embodiment, the push notification may include an HTML link that includes the WAN IP address and access credential of embedded device C.

At the second mobile device side, method 810 continues with the admin device D, within the admin application, receiving the push notification with the WAN IP address and credential for embedded device C, and responding by transmitting the access credential and the WAN IP address for embedded device C to embedded device D (step 824). For example, merge request module 781 of admin device D may receive the push notification, which as noted above may include an HTML link that includes the access credential and the WAN IP address of embedded device C. Merge request module 781 may automatically select, or may prompt the administrator for admin device D 721 to select, the link. Responsive to selection of the link, or otherwise responsive to the push notification, merge request module 781 of admin device D may transmit the access credential and WAN IP address for embedded device C 710 to embedded device D 711.

At the side of the second embedded device, namely embedded device D, the access credential and WAN IP address for embedded device C may be received from admin device D within the family cloud application (step 841). For example, merge module 771 of embedded device D 711 illustrated in FIG. 7 may receive the access credential and WAN IP address for embedded device C from merge request module 781 of admin device D, and then may store that access credential and WAN IP address within the computer readable medium (not specifically illustrated) of embedded device D. Then, at embedded device D, the family cloud application automatically may submit a merge request to embedded device C based on the access credential and WAN IP address for embedded device C (step 842). For example, merge module 771 of embedded device D 711 may generate a message that includes the access credential and WAN IP address for embedded device D, and may transmit that message to embedded device C.

At the side of the first embedded device, namely embedded device C, the access credential and the WAN IP address for embedded device D may be received and used to automatically merge the cloud of embedded device C with the cloud of embedded device D (step 832). Specifically, merge module 770 of embedded device C 710 may store the WAN IP address for embedded device D within the computer readable medium of embedded device C, and may establish an SSH connection with embedded device D based on the WAN IP address and access credential. Preferably, embedded device C 710, within the family cloud application, automatically sends a push notification of the successful merge of the family clouds of embedded devices C and D to admin devices C and D (step 833). Note, however, that because bidirectional secure communication (e.g., SSH) has been established between embedded devices C and D, push notification may not be needed to inform admin devices C and D that the merge of the family clouds has been successful; instead, simple messaging via the established connection may be used.

Following such storage and connection, merge module 770 of embedded device C 710 may use the WAN IP address for embedded device D to communicate digital information to embedded device D. Conversely, merge module 771 of embedded device D 711 may store the access credential and WAN IP address for embedded device C (step 841), and may use the access credential and WAN IP address to establish an SSH connection with embedded device D to communicate digital information to embedded device D. Moreover, embedded device C also may receive and store the ID for admin device D and so may communicate push notifications of digital information to admin device D; and embedded device D also may receive and store the ID for admin device C and so may communicate push notifications of digital information to admin device C. However, other family devices that may be enrolled to the family cloud of embedded device C may not necessarily be enrolled to the family cloud of embedded device D, and family devices that may be enrolled to the family cloud of embedded device D may not necessarily be enrolled to the family cloud of embedded device C. Methods for synchronizing information between embedded devices C and D so as to share information among family members (or other users) who may be enrolled only to one of embedded devices C and D are described further below with reference to FIGS. 9A and 9B.

Note that other methods of initiating merging of the clouds of embedded device C 710 and embedded device D 711 illustrated in FIG. 7 alternatively may be used. For example, initiation method 810 applies to a situation in which the administrator of the cloud for embedded device D requests to merge with the cloud of embedded device C. Alternative method 810' described below with reference to FIG. 8D may be used in place of method 810 illustrated in FIG. 8B for situations in which the administrator of the cloud for embedded device C instead invites the administrator of the cloud for embedded device D to merge with the cloud for embedded device C.

Alternative method 810' begins analogously as method 810, e.g., by enrolling admin device C to the family cloud of embedded device C (step 811) and by enrolling admin device D to the family cloud of embedded device D (step 821). Method 810' then continues at step 814, at admin device C, within the admin application, by receiving the email address of the administrator of embedded device D's family cloud and a request to merge the family cloud of embedded devices C and D (step 814). Such an email and request may be received in a manner analogous to that described above with reference to step 822 of method 810.

Method 810' then may continue by automatically generating a message containing an invitation and a link to merge the family clouds of embedded devices C and D, and responsive to the administrator's approval sending the email message to the administrator for admin device D (step 815). Such a message, link, approval, and sending may be performed in a manner analogous to that described above with reference to step 823. The message then may be received at admin device D (step 825) in a manner analogous to that described above with reference to step 812. Then, responsive to the administrator's selection of the link, a reply message automatically may be generated that contains the ID for admin device D and a link to approve the merge, and responsive to administrator approval the email message may be sent to admin device C using the native email application on admin device D (step 826). The reply message may be generated in a manner analogous to that described above with reference to step 323 of FIG. 3. Then, the email message may be received at admin device C (step 816) in a manner analogous to that described above with reference to step 812 of FIG. 8B. The process of merging the clouds of embedded devices C and D then may continue with method 811 described above with reference to FIG. 8C.

Figure 8E:
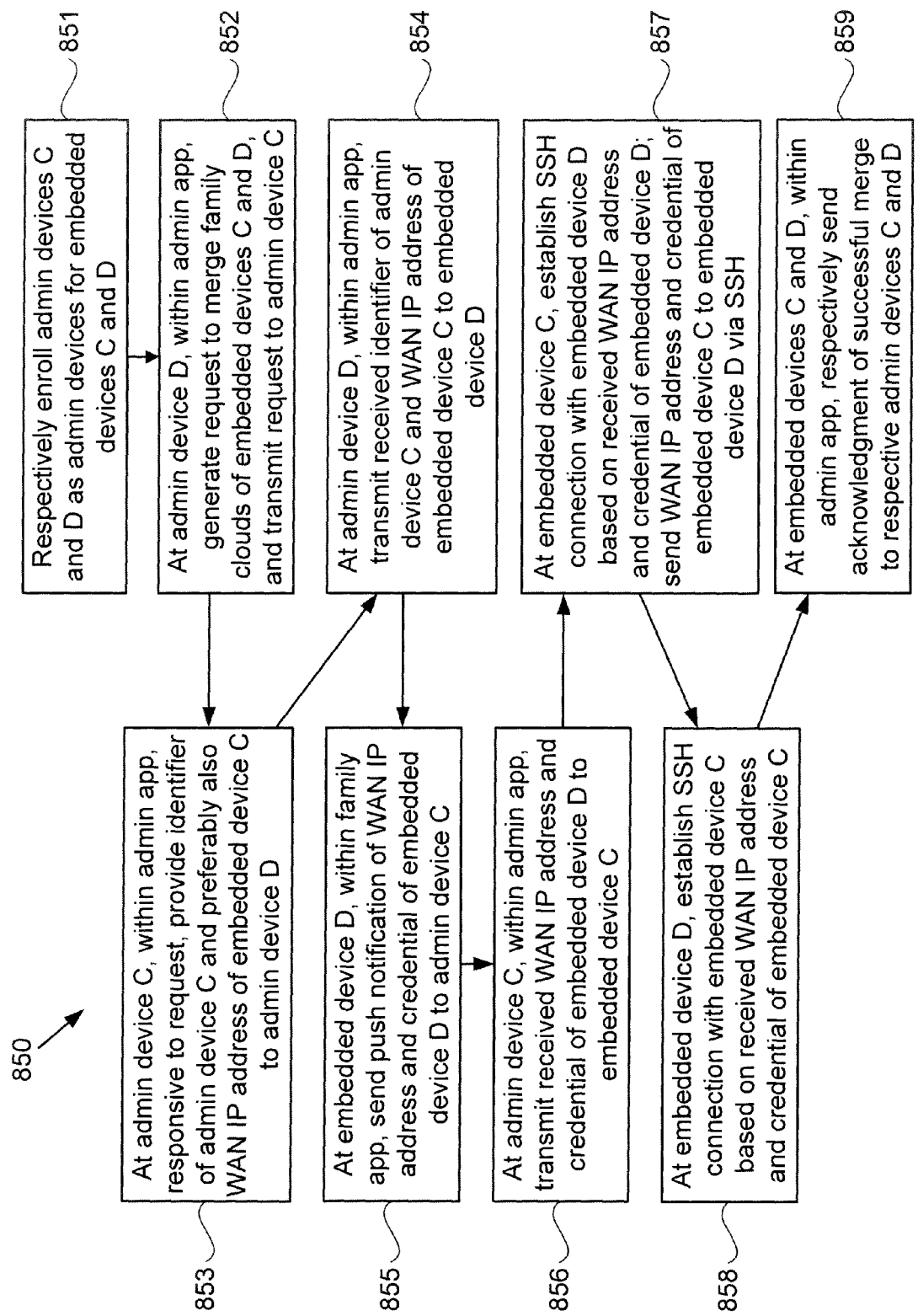

FIG. 8E illustrates another exemplary method 850 that may be used to merge the family clouds of embedded devices C and D. Method 850 includes respectively enrolling admin devices C and D as the admin devices for embedded devices C and D, e.g., in the manner described above with reference to FIG. 3. Preferably, admin device C is enrolled as the administrator for embedded device C, and thus may communicate securely (e.g., via SSH) with embedded device C; and admin device D is enrolled as the administrator for embedded device D, and thus may communicate securely (e.g., via SSH) with embedded devices C and D.

Method 850 illustrated in FIG. 8E continues with admin device D, within the admin app, generating a request to merge the family clouds of embedded devices C and D (step 852), e.g., upon user selection of a suitable button within a GUI generated by merge request module 781 illustrated in FIG. 7. Merge request module 781 of admin device D then transmits the request to admin device C. In one illustrative embodiment, the request is in the form of an email that is prepared using a native email application such as described in greater detail above and is sent to the user of admin device C.

Referring again to FIG. 8E, responsive to the request received from admin device D, the admin application of admin device C provides the identifier of admin device C and preferably also the WAN IP address of embedded device C to admin device D (step 853). For example, if the request was in the form of an email, then admin device C may prepare and send to the user of admin device D a reply email that contains the identifier, such as described in greater detail above. Then, at admin device D, the admin application transmits the received identifier of admin device C and WAN IP address of embedded device C to embedded device D (step 854).

Embedded device D, within the family application, then sends a push notification of the WAN IP address of embedded device D to admin device C, along with an access credential that embedded device C may use to securely communicate with embedded device D (step 855). The admin app of admin device C then may transmit the received WAN IP address and credential of embedded device D to embedded device C (step 856), preferably via an SSH connection.

Embedded device C then may establish an SSH connection with embedded device D based on the received WAN IP address and access credential, and then may send the WAN IP address and access credential of embedded device C to embedded device D via SSH (step 857). For example, merge module 770 of embedded device C 710 may transmit the WAN IP address and access credential of embedded device C to merge module 771 of embedded device D via such an SSH connection. Optionally, the SSH connection established in step 857 may be "uni-directional," for example if embedded device C does not wish to permit embedded device D to proactively access digital information on embedded device C.

Embedded device D then may establish an SSH connection with embedded device C based on the received WAN IP address and credential of embedded device C (step 858), thus resulting in a secure bidirectional communication pathway between embedded devices C and D via which mobile devices respectively enrolled to the clouds of the embedded devices may share digital information with one another. Preferably, embedded devices C and D, within the admin application, respectively send an acknowledgment of the successful merge to their respective admin devices C and D (step 859).

It should be appreciated that any of the methods described above with reference to FIG. 1 suitably may be modified for use with system 700 illustrated in FIG. 7. Additionally, it may be appreciated that regardless of the particular manner in which the clouds of different embedded devices are merged together, the digital information on one of the embedded devices conveniently may be synchronized with the digital information on the other embedded devices via the merged cloud, so as to facilitate the sharing of such information with users who may be enrolled to the respective clouds.

Figure 9A:
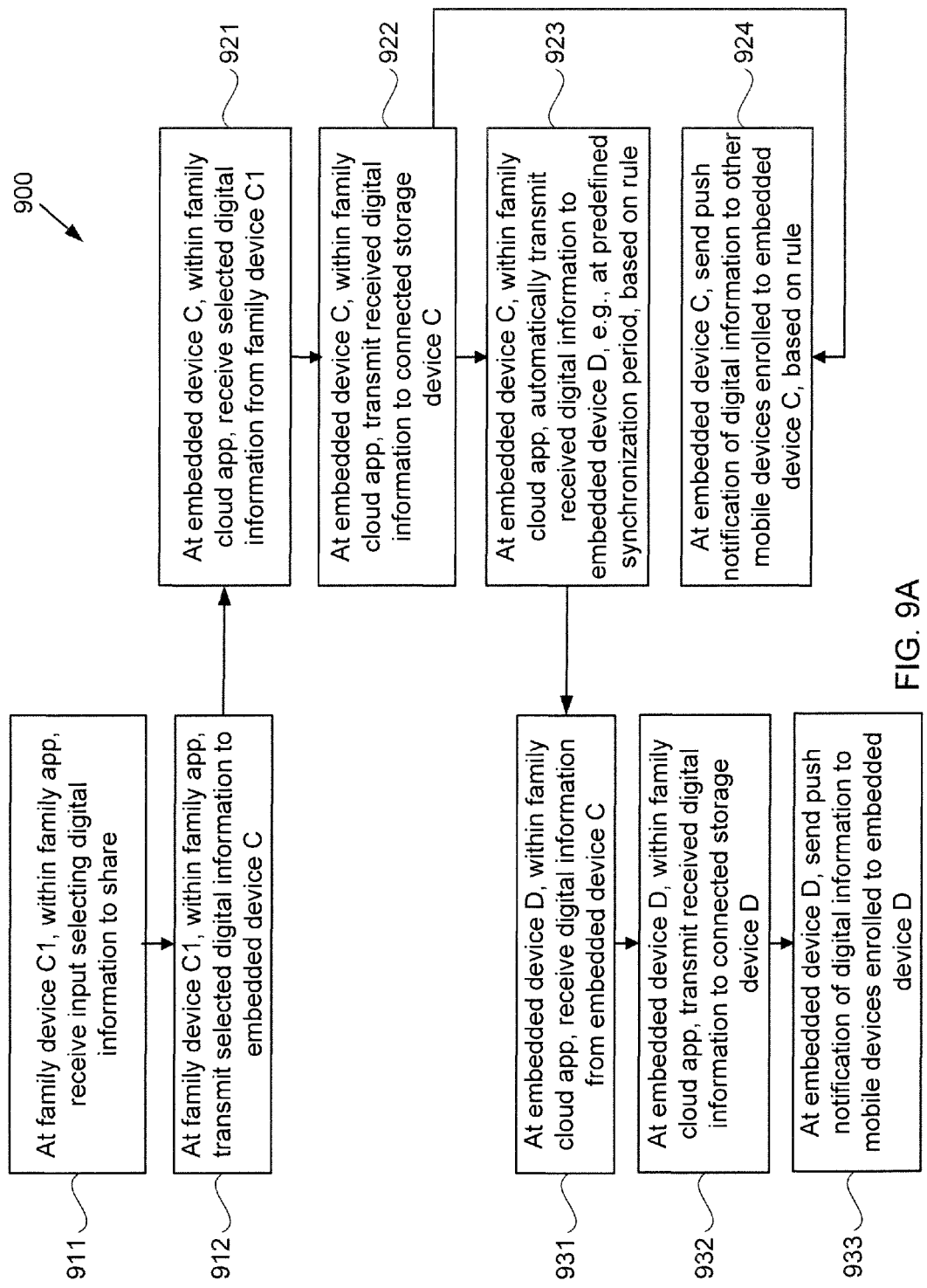
FIGS. 9A-9B illustrate steps executed by embedded devices and by mobile devices during exemplary methods for sharing digital information between the mobile devices using a merged family cloud.

For example, FIG. 9A illustrates steps executed by embedded devices and by mobile devices during an exemplary method 900 for sharing digital information between the mobile devices using a merged family cloud. Method 900 may begin on the mobile device side at step 911, in which family device C1 (enrolled only to the family cloud of embedded device C), receives within the family application input selecting digital information to share. Exemplary methods of receiving such input are described further above with reference to step 412 of FIG. 4. Method 900 may continue on the mobile device side at step 912, in which family device C1, within the family app, transmits the selected digital information to embedded device C, e.g., in a manner analogous to that described above with reference to step 413 of FIG. 4.

Then, on the side of a first embedded device, specifically embedded device C, the selected digital information is received within the family cloud application from family device C1 (step 921) and then may be transmitted to an internal or external storage device C (step 922), e.g., in a manner analogous to that described above with reference to step 422 and 423 of FIG. 4. Within the family cloud application, embedded device C further may send a push notification of the digital information to other mobile devices that may be enrolled to embedded device C, e.g., admin device C, based on a rule (step 924). Additionally, within the family cloud application, embedded device C automatically may transmit the received digital information to embedded device D, based on a rule (step 923). For example, embedded device C may send a message containing the digital information to the stored WAN IP address for embedded device D. Preferably, but not necessarily, embedded device C sends such digital information to embedded device D at a predefined synchronization period, e.g., once an hour, or once a day, or once a week, so as to avoid the need to continuously communicate with embedded device D. Note that steps 923 and 924 may be performed in any suitable order, or even concurrently. Then, on the side of a second embedded device, specifically embedded device D, the family cloud application may receive the digital information from embedded device C (step 931), e.g., via the Internet, may transmit the received digital information to internal or external storage device D (step 932), and may send a push notification of the digital information to mobile devices that are enrolled to embedded device D (step 933), for example in the manner described above with reference to steps 422-424 illustrated in FIG. 4.

Figure 9B:
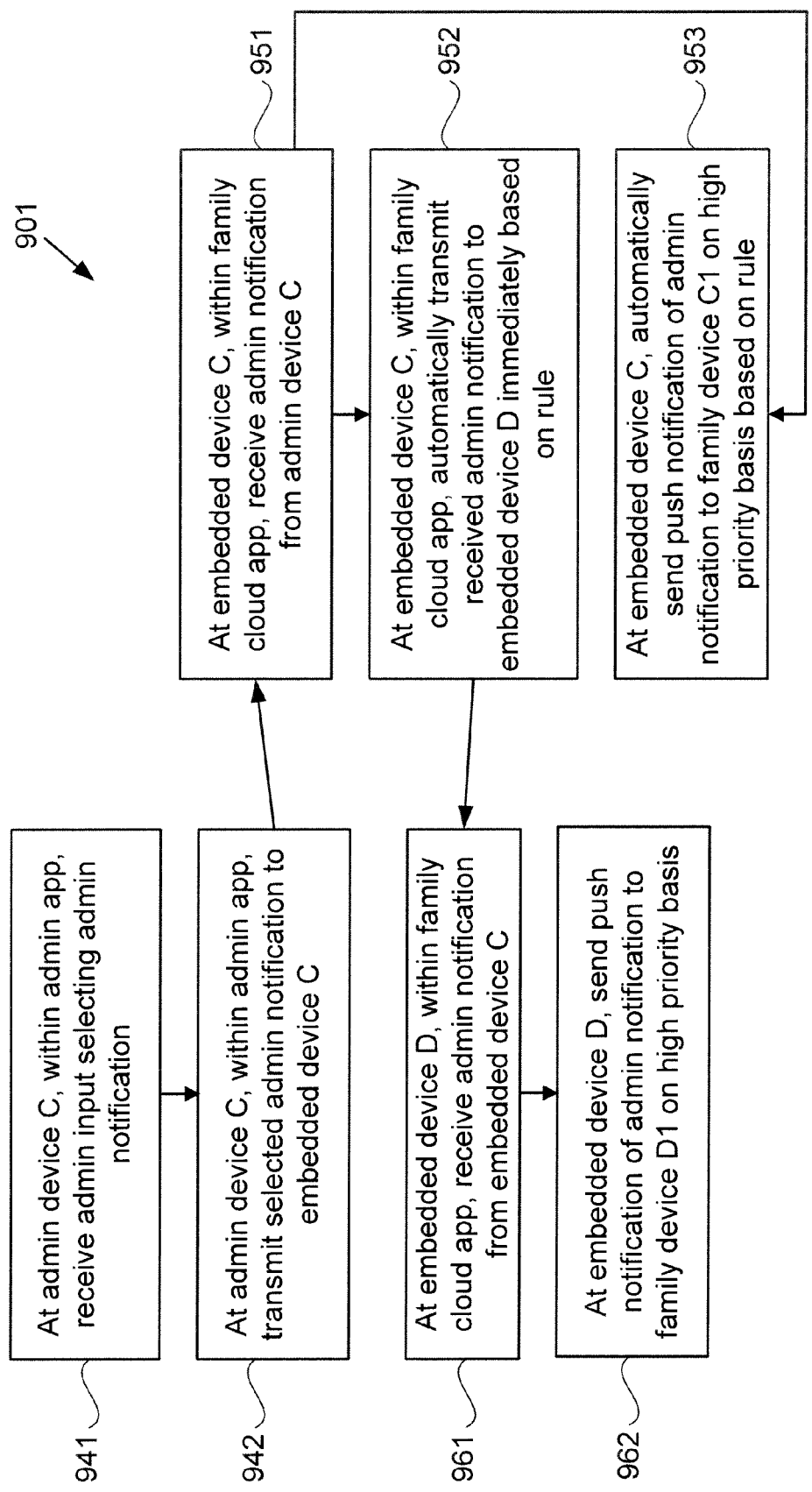

Depending on the particular type or source of the digital information, the sharing of that information between the embedded devices and the mobile devices enrolled thereto may be prioritized. For example, FIG. 9B illustrates steps executed by embedded devices and by mobile devices during an exemplary method 901 for sharing high priority digital information between the mobile devices using a merged family cloud. Specifically, certain messages generated by an administrator, such as a notification of a security break or a family emergency, may be assigned a higher priority and promptly synchronized between the embedded devices on the merged cloud.

Method 901 may begin on the mobile device side at step 941, in which admin device C receives within the admin application input selecting an admin notification. For example, the sharing module within the admin application on the admin device may include a GUI that causes an "admin notification" button to be displayed, which the administrator may select and use to enter a text message or other information to be assigned a high priority for sharing with other mobile devices in the merged cloud. Exemplary methods of receiving such input are described further above with reference to step 412 of FIG. 4. Method 901 may continue on the mobile device side at step 942, in which the admin device C, within the admin app, transmits the admin notification to embedded device C, e.g., in a manner analogous to that described above with reference to step 413 of FIG. 4.

Then, on the side of a first embedded device, specifically embedded device C, the admin notification is received within the family cloud application from admin device C (step 951), e.g., in a manner analogous to that described above with reference to step 422 of FIG. 4. Within the family cloud application, embedded device C further may send a push notification of the digital information immediately to other mobile devices that may be enrolled to embedded device C, e.g., admin device C, based on a rule (step 953). Additionally, within the family cloud application, embedded device C automatically may transmit the received digital information immediately to embedded device D, based on a rule (step 952). For example, embedded device C may send a message containing the admin notification to the stored WAN IP address for embedded device D. Preferably, embedded device C sends the message on a priority basis, e.g., internally prioritizes the message above other push notifications or outgoing messages. Note that steps 952 and 953 may be performed in any suitable order, or even concurrently. Then, on the side of a second embedded device, specifically embedded device D, the family cloud application may receive the admin notification from embedded device C (step 961), e.g., via the Internet, and may send a push notification of the digital information immediately to mobile devices that are enrolled to embedded device D (step 933), for example in the manner described above with reference to steps 422-424 illustrated in FIG. 4. Preferably, the family cloud applications of embedded devices C and D are configured so as to recognize the priority nature of the admin notification based on the content or format of the notification, and to handle the notification on a priority basis accordingly.

As described above with reference to FIG. 6, the ISP to which an embedded device may be connected may dynamically assign a WAN IP address to the embedded device, and accordingly the embedded device's WAN IP address may change from time to time. Occasionally, the WAN IP addresses of more than one embedded device within system 700 illustrated in FIG. 7 may change at the same time; the present systems and methods readily may be adapted to communicate the WAN IP address from one embedded device to another, even if the WAN IP address of neither embedded device is known to the other.

Figure 10:
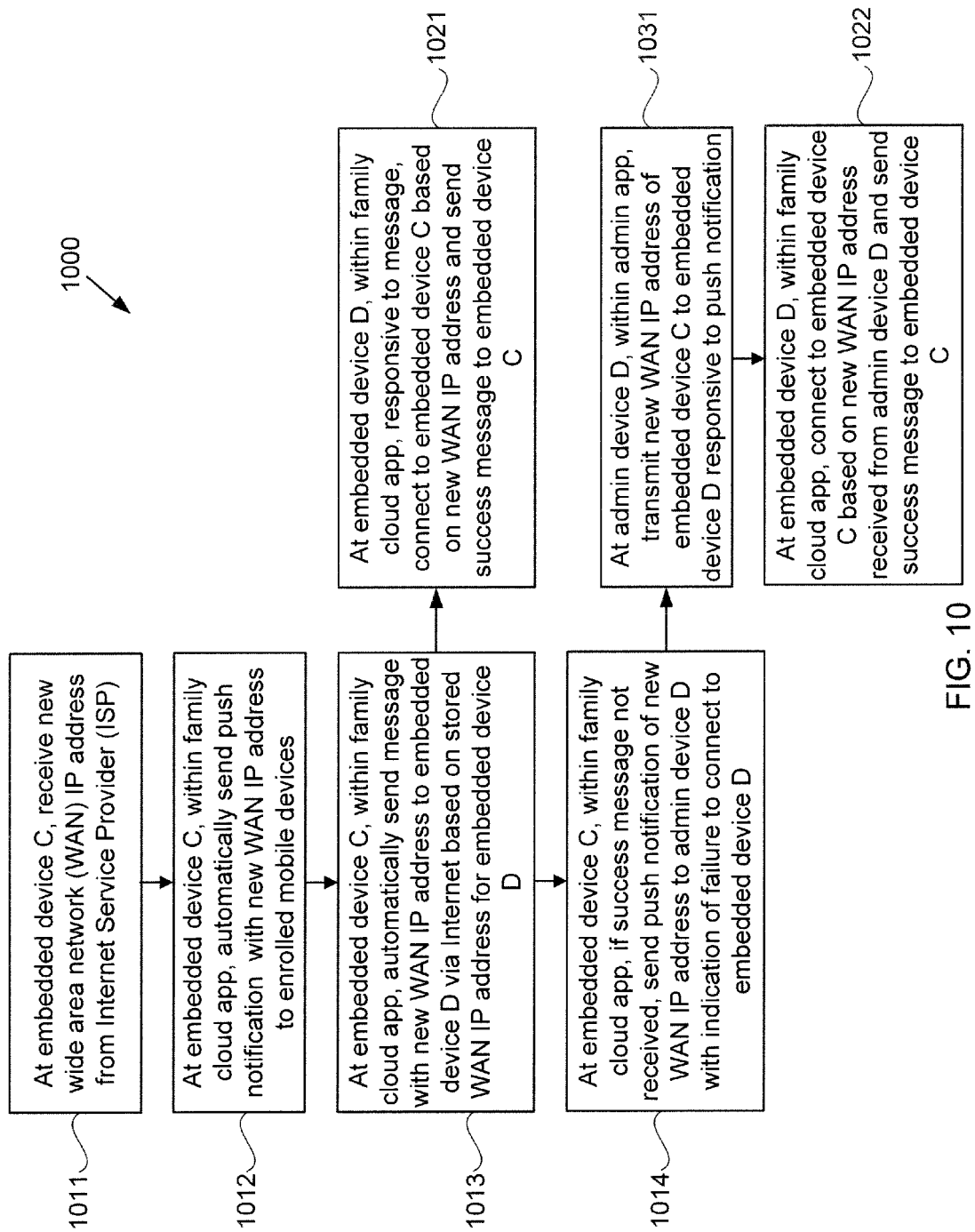
FIG. 10 illustrates steps executed by embedded devices and by mobile devices during an exemplary method for maintaining a merged family cloud after one or more of the embedded devices receives a new IP address.

Specifically, FIG. 10 illustrates steps executed by embedded devices and by mobile devices during an exemplary method 1000 for maintaining communication between embedded devices, e.g., for maintaining a merged family cloud after one or more of the embedded devices receives a new WAN IP address. Method 1000 includes, on the side of a first embedded device, specifically embedded device C, receiving a new WAN IP address from an ISP, e.g., as described above with reference to step 611 illustrated in FIG. 6 (step 1011). Then, at embedded device C, within the family cloud application, a push notification of the new WAN IP address may be sent to enrolled mobile devices, e.g., in a manner analogous to that described above with reference to step 612 illustrated in FIG. 6. Additionally, at embedded device C, within the family cloud application, a message with the new WAN IP address automatically may be sent to embedded device D via the Internet based on the stored WAN IP address for embedded device D (step 1013).

On the side of the second embedded device, e.g., embedded device D, the message may be received, and responsive to the message embedded device D may connect to embedded device C based on the new WAN IP address and may send a success message to embedded device C (step 1021). However, if the WAN IP address for embedded device D that was stored in embedded device C was out of date, e.g., if the WAN IP address for embedded device D changed at approximately the same time as did the WAN IP address for embedded device C, then embedded device D may not receive the message at step 1021.

On the side of the first embedded device, specifically embedded device C, if the family cloud application does not receive the success message, then the family cloud application may send a push notification of the new WAN IP address to admin device D with an indication of the failure to connect to embedded device D (step 1014), e.g., in a manner analogous to that described above with reference to step 831 of FIG. 8C, but further including the indication of the failure to connect to embedded device D. At admin device D, the admin application may transmit the new WAN IP address of embedded device C to embedded device D responsive to the push notification (step 1031), e.g., in a manner analogous to that described above with reference to step 824. Embedded device D then may connect to embedded device C within the family cloud application based on the new WAN IP address received from admin device D, and may send a success message to embedded device C (step 1022). The success message preferably includes the WAN IP address of embedded device D, so that embedded devices C and D once again may have the correct WAN IP address for one another and may share digital information with one another, e.g., using the methods provided herein.

Alternatively, as noted above, methods based on DDNS may be used to maintain communication between embedded devices C and D in the event that the WAP IP address of one or both of the embedded devices changes. Accordingly, the IP address update modules of each of embedded devices C and D may be configured to maintain communication with each other retrieving each others' new embedded device WAN IP address from a dynamic domain name system (DDNS) server.

Sharing Embedded Device-Related Information

Although the foregoing embodiments primarily are described with reference to sharing digital information that originates from a mobile device or from an internal storage device or external storage device coupled to the embedded device, it should be understood that the digital information alternatively may originate from the embedded device itself. One example of such information is a new WAN IP address that has been assigned to the embedded device; when the embedded device determines that its WAN IP address has changed, it may push a notification of the new WAN IP address to any mobile devices or other embedded devices that are part of that embedded device's wireless cloud, e.g., as described above with reference to FIG. 10. Another example of such information is a new SSID for the embedded device; when the embedded device determines that has a new SSID, it may push a notification of the new SSID to any mobile devices that are part of that embedded device's wireless cloud and that communicate with the embedded device via Wi-Fi. Analogously, the memory of the embedded device may store one or more rules that cause the embedded device to send push notifications to admin or family devices enrolled thereto under predefined circumstances. For example, the family cloud application of the embedded device may include a module that causes the embedded device to push a notification to the admin device of that embedded device that includes a statistic of the embedded device, such as if the load on the embedded device becomes too high or if there are too many devices connected to the embedded device. Based on the push notification, the admin device may attempt to address the statistic, for example by forcing a disconnection of a device that is using too much bandwidth. Or, for example, the family cloud application of the embedded device may include a module that causes the embedded device to push a notification to the admin device of that embedded device that includes an indication that the embedded device was attacked, such as if the embedded device detects greater than a predefined number of attempts to enroll in the family cloud. Based on the push notification, the admin device may attempt to address the attack, e.g., by temporarily disabling the family cloud. Other suitable types, origins, and uses of digital information within the family cloud may be envisioned.

Additionally, sharing digital information among mobile devices and embedded devices within a merged family cloud may provide further enhancements in user experience and functionality. For example, the admin of a first family cloud may be particularly technically savvy, while the admin of a second cloud, merged with the first cloud, may not be particularly savvy. If the admin of the second cloud encounters difficulties—for example, receives an embedded device-related notification such as mentioned above—the embedded device generating the second cloud may permit the admin of the first cloud to access it so as to attempt to address the issue.

Loadable Application Components

As described above with reference to FIG. 1, certain embodiments of the present invention may permit executable modules or components associated with a new application, e.g., executable application components within the family cloud application of embedded device 110 or that are independent of the family cloud application, to be dynamically loaded without requiring the software of the embedded device to be reloaded in its entirety or requiring the embedded device to be restarted. In particular, a new application for sharing information using the family cloud may include a first module or component that is executed on the embedded device, and a second and complementary module or component that is executed on a mobile device. The various executable application components on the embedded device preferably are configured to remain in an active state, so that they readily may interact with the complementary application components on the mobile device or other embedded device on an as-needed basis. In comparison, as noted above, previously known embedded devices such as gateways may be configured to close executable modules in the absence of detectable logical input/output devices.

Additionally, the various executable application components or modules on the embedded device preferably are configured so as to permit the components to be updated or replaced separately from one another—and indeed entirely new components to be added—without requiring refresh of all of the software on the embedded device. For example, a software developer may develop a new application configured to permit a new type of digital information to be shared, and may make that application available on a web page or online application store for download to a mobile device for free or for a fee. Alternatively, the developer may provide the application as an update to an existing software application. Such a new or updated application may have a component for execution on the mobile device, and another component for execution on the embedded device. The present embedded device preferably is configured so as to permit the embedded device component of the module readily to be loaded for execution on the embedded device. Such a component may be referred to herein as a "loadable module."

Figure 11A:
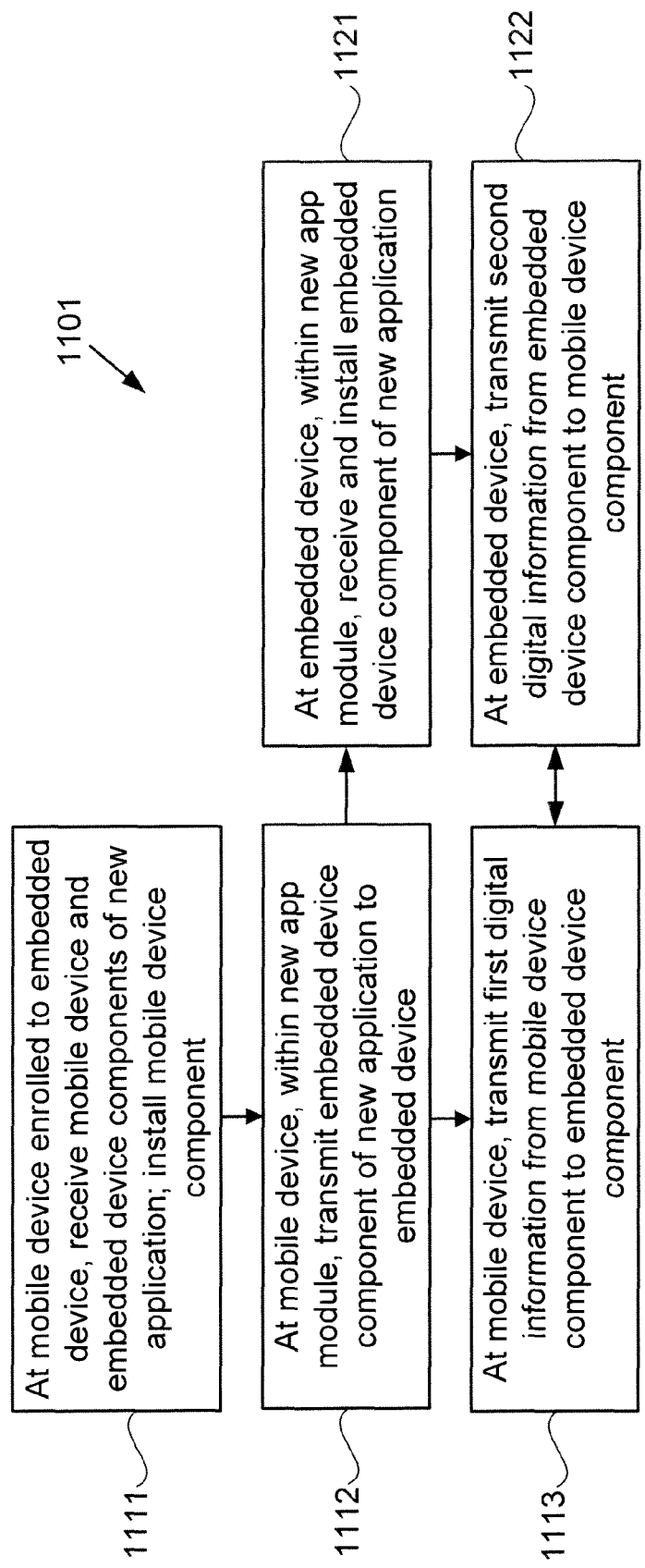
FIGS. 11A-11B illustrate steps executed by embedded devices and by mobile devices during an exemplary method for updating an executable module on an embedded device.

The present embedded devices may receive and use such components or loadable modules in a variety of suitable ways. For example, FIG. 11A illustrates a first illustrative method 1101 in which module component is transmitted to the embedded device by a mobile device. Specifically, method 1101 begins on the mobile device side, at which a mobile device enrolled to the embedded device receives a new application, and then installs the mobile device component of that application (step 1111). In this embodiment, the mobile device receives the entire new application—that is, both the mobile device component and the embedded device component of the application—but only installs the mobile device component. The mobile device then may connect to the embedded device, such as via an SSH connection, and may transmit the embedded device component of the new application to the embedded device (step 1112). Such connection and transmission may be made automatically responsive to installation of the mobile device component of the module, or may be made at a later time, and optionally may be conditioned on user approval of the transmission in a manner analogous to that described above; alternatively, the embedded device may detect the new application module on the mobile device, and may request the embedded device component of the module from the mobile device.

Then, on the embedded device side, within the new app module, the embedded device may receive and install the embedded device component of the new application from the mobile device (step 1121). Then, at the mobile device, the mobile device component may be executed by the processor of the mobile device and may transmit first digital information to the embedded device component (step 1113). At the embedded device, the embedded device component may be executed by the processor of the embedded device and may transmit second digital information to the mobile device component (step 1122). Accordingly, the embedded device may load and utilize a new executable application component, providing enhanced functionality, without the need for user intervention.

Figure 11B:
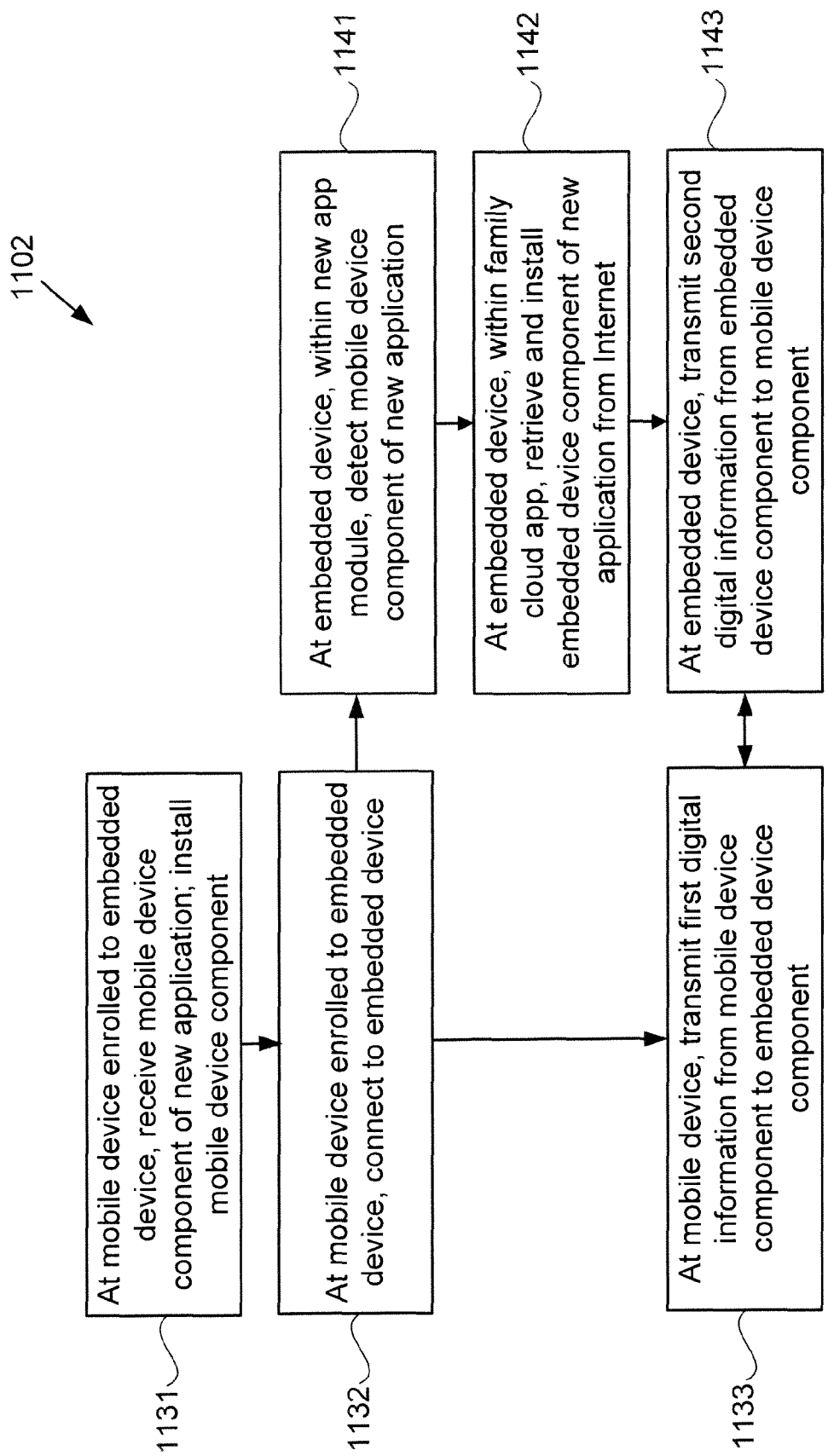

FIG. 11B illustrates an alternative illustrative method 1102 in which the embedded device downloads the embedded device component of the new application from the Internet. Specifically, method 1102 begins on the mobile device side, at which a mobile device enrolled to the embedded device receives and installs the mobile device component of a new application (step 1131). In this embodiment, the mobile device receives only its own component of the application. The mobile device then may connect to the embedded device, such as via an SSH connection (step 1132). Such connection and transmission may be made automatically responsive to installation of the mobile device component of the module, or may be made at a later time, and optionally may be conditioned on user approval of the transmission in a manner analogous to that described above.

Then, on the embedded device side, within the new app module, the embedded device may detect the mobile device component of the new application (step 1141). For example, the new app module of the embedded device may be configured to proactively determine upon connection whether the mobile device has any new application components, or alternatively the mobile device may be configured upon connection to notify the embedded device of any new application components. The embedded device then, within the new app module, may retrieve the embedded device component of the new application from the Internet and install that component (1142). Then, at the mobile device, the mobile device component may be executed by the processor of the mobile device and may transmit first digital information to the embedded device component (step 1133). At the embedded device, the embedded device component may be executed by the processor of the embedded device and may transmit second digital information to the mobile device component (step 1143). Accordingly, the embedded device may load and utilize a new executable application component, providing enhanced functionality, without the need for user intervention.

Note that the use of such loadable modules need not necessarily be tied to the use of a family cloud, and that any embedded device (including an embedded device that does not have a family cloud) may be configured so as to include loadable modules. For example, the application module components described above may be received and installed within the admin or family application on the mobile device or within the family cloud application on the embedded device, or instead may be received and installed within any suitable program being executed on the respective device or embedded device. Indeed, the embedded device may be configured so as to obtain loadable modules at any suitable time from the Internet, and need not necessarily do so responsive to installation of mobile device components on a mobile device.

Alternative Embodiments

It is noted that the systems and methods may be implemented on various types of data processor environments (e.g., on one or more data processors) which execute instructions (e.g., software instructions) to perform operations disclosed herein. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

Figure 12:
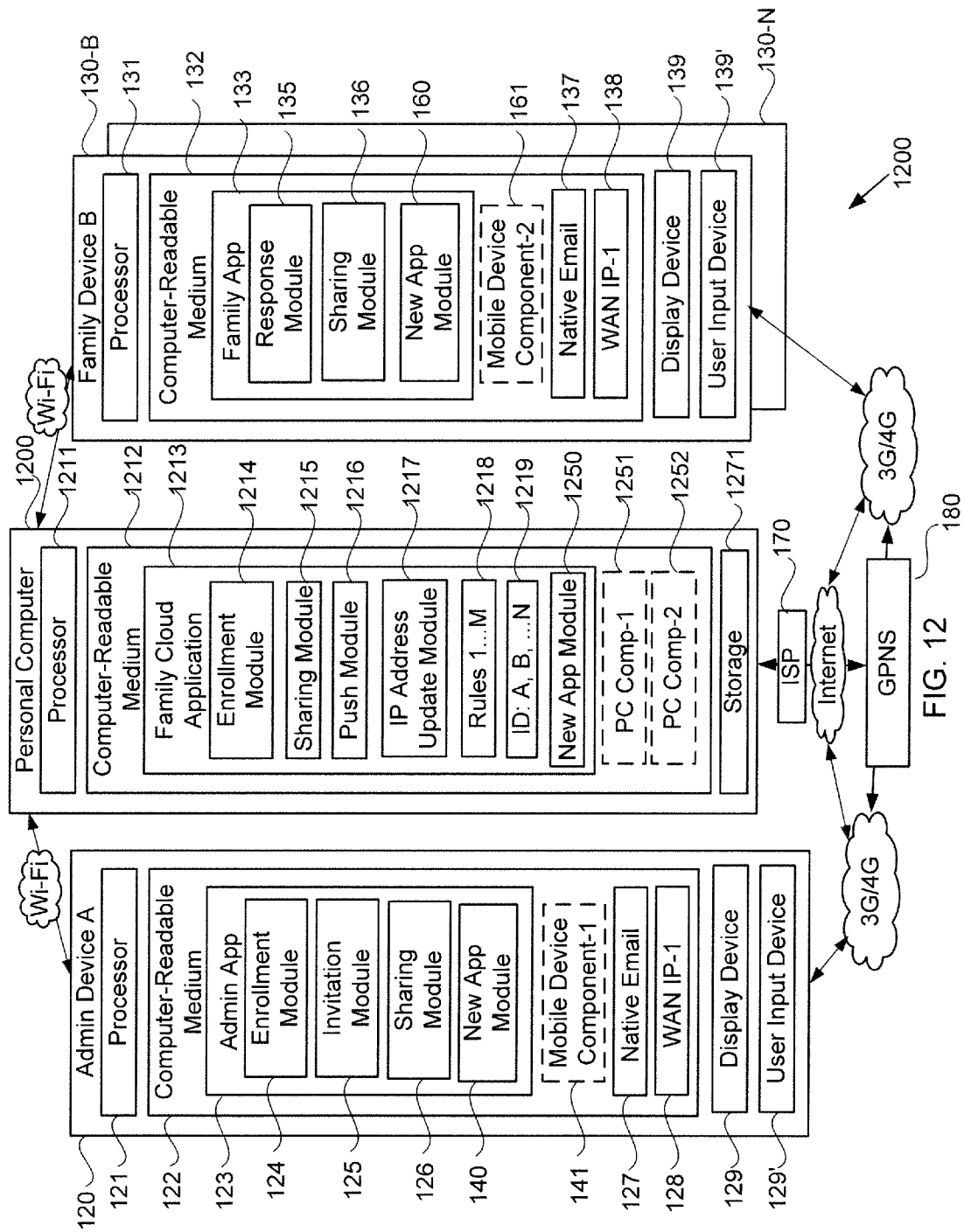
FIG. 12 illustrates an exemplary personal computer-based system for providing a family cloud for sharing digital information between mobile devices.

Indeed, although the systems and methods provided herein primarily have been described with reference to embedded devices, it should be appreciated that the principles thereof suitably may be modified for use with per-sonal computers rather than embedded devices. For example, FIG. 12 illustrates personal computer-based system 1200 for providing a family cloud for sharing digital information between mobile devices, according to some embodiments of the present invention. System 1200 includes personal computer 1210, admin mobile device A 120, and a plurality of family mobile devices B . . . N 130-B . . . 130-N, in which admin mobile device A 120 and family mobile devices B . . . N 130-B . . . 130-N may be configured analogously as described above.

Personal computer 1210 may include processor 1211, non-volatile computer-readable medium or memory 1212, a Wi-Fi transceiver (not specifically illustrated) via which the personal computer may wirelessly connect to admin device A 120 and optionally also family device B 130-B, a first input/output (I/O) port (not specifically illustrated) via which the personal computer may connect to the Internet, optionally via internet service provider (ISP) 170, and a storage device 1271. In preferred embodiments, the I/O port connects to a wireless gateway (not illustrated) that includes a modem, such as an analog modem, cable modem, long-term evolution (LTE) modem, fiber modem, digital subscriber line (DSL) modem, or very-high-bit-rate digital subscriber line (VDSL) modem, that facilitates connection between personal computer 1210 and ISP 170 and then to the Internet via appropriate cabling. Storage device 1271 may include an internal or external hard drive based on FLASH, RAM, ROM, EPROM, EEPROM, or a magnetic or optical disk or tape. Preferably, the wireless gateway further is configured to allow mobile devices connected thereto to access both personal computer 1200 and the Internet via the Wi-Fi transceiver and port 1219 upon exchange of suitable credentials, such as a login and password or an encryption key.

Computer-readable medium 1212 of personal computer 1210 is configured to store family cloud application 1213, which includes enrollment module 1214, sharing module 1215, push module 1216, IP address update module 1217, rules 1 . . . M 1218, and identifiers A, B, . . . N 1219, which may be configured analogously as the corresponding modules, rules, and identifiers respectively described above with reference to the embedded system-based embodiments. Additionally, computer-readable medium 1212 preferably further stores new application ("app") module 1250, a personal computer component of a first new application ("PC comp-1") 1251, and a personal computer component of a second new application ("PC comp-2") 1251, which may be configured analogously as the corresponding module and components respectively described above with reference to the embedded system-based embodiments. In this regard, note that although personal computer 1210 may not have resource constraints analogous to an embedded device, a given application executing on personal computer 1210 may be confined in a similar manner to that of an embedded device. Accordingly, new application module 1250 and personal computer components of new applications that may be loaded onto personal computer 1210 thereby suitably may be adapted for use in facilitating adding or updating new application components on a personal computer, and are not limited to use in embedded devices.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. Moreover, it should be understood that the above-described modules, such as the enrollment modules, invitation modules, sharing modules, new application modules, push modules, IP address update modules, and response modules, may include any suitable number and type of sub-modules, subroutines, or the like.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

While various illustrative embodiments of the invention are described above, it will be apparent to one skilled in the art that various changes and modifications may be made therein without departing from the scope of the invention. For example, it should be understood that any suitable type of digital information may be shared using the present systems and methods, including but not limited to photographs, photo albums, videos, video compilations, music, notes, calendars, calendar entries, to-do items, news articles, text messages, links to web pages, You-Tube™ videos, or Instagrams, GPS locations, and the like. The appended claims are intended to cover all such changes and modifications that fall within the true spirit and scope of the invention.

What is claimed:

1. A method for sharing digital information between first and second mobile devices, the method comprising:
    at the first mobile device, sending to the second mobile device an invitation to join a group;
    at the first mobile device, receiving from the second mobile device an identifier of the second mobile device;
    at the first mobile device, sending the identifier of the second mobile device to an embedded device after receiving the identifier of the second mobile device from the second mobile device;
    at the embedded device, enrolling the second mobile device in the group based upon receiving the identifier of the second mobile device from the first mobile;
    at the embedded device, transmitting to the first mobile device an invitation push notification comprising an invitation for the first mobile device to share the digital information;
    at the embedded device, receiving the digital information from the first mobile device, wherein the embedded device receives the digital information transmitted from the first mobile device responsive to the invitation push notification;
    at the embedded device, notifying the second mobile device of the digital information via a push notification; and
    at the embedded device, maintaining communication with the first and second mobile devices.

2. The method of claim 1, wherein maintaining communication with the first and second mobile devices comprises notifying the first and second mobile devices of a new embedded device WAN IP address via respective additional push notifications.

3. The method of claim 1, wherein maintaining communication with the first and second mobile devices comprises the first and second mobile devices using a domain name to retrieve the new embedded device WAN IP address from a dynamic domain name system (DDNS) server.

4. The method of claim 1, wherein sending the invitation comprises establishing communication with the second mobile device by emailing the invitation from the first mobile device to the second mobile device, the invitation prompting the second mobile device to download an application and to transmit the identifier of the second mobile device to the first mobile device.

5. The method of claim 4, wherein transmitting the identifier of the second mobile device to the first mobile device comprises emailing a reply message to the first mobile device, the reply message prompting the first mobile device to transmit the identifier of the second mobile device to the embedded device.

6. The method of claim 1, wherein notifying the second mobile device of the digital information via the push notification comprises generating a message relating to the digital information and transmitting the message from the embedded device through a Global Push Notification Server or third-party push notification service.

7. The method of claim 1, further comprising:
    at the second mobile device, receiving the push notification; and
    at the second mobile device, responsive to receipt of the push notification, requesting the digital information from the embedded device.

8. The method of claim 1, further comprising storing the digital information at the embedded device, wherein the embedded device notifies the second mobile device of the digital information at a predetermined period after storing the digital information at the embedded device.

9. The method of claim 1, further comprising receiving at the embedded device, from the Internet or from one of the first and second mobile devices, an embedded device component of an application.

10. The method of claim 9, wherein the one of the first and second mobile devices pushes the embedded device component of the application to the embedded device.

11. The method of claim 9, wherein the embedded device requests the embedded device component of the application from the one of the first and second mobile devices responsive to detection by the embedded device of a mobile device component of the application on the one of the first and second mobile devices.

12. The method of claim 1, wherein the embedded device is selected from the group consisting of: a gateway, a wireless gateway, a router, a wireless router, a media player, a wireless media player, an access point, a wireless access point, a network access storage (NAS) device, a thumb drive, and an embedded server.

13. The method of claim 1, further comprising:
    at the embedded device, transmitting the digital information to a second embedded device;
    at the second embedded device, notifying a third mobile device of the digital information via a second push notification; and
    at the second embedded device, maintaining communication with the third mobile device.

14. The method of claim 13, further comprising establishing communication between the embedded device and the second embedded device by performing steps comprising:
    at the embedded device, receiving an identifier of the third mobile device from the first mobile device;
    at the embedded device, sending an embedded device wide area network (WAN) Internet protocol (IP) address and access credential to the third mobile device via a third push notification;
    at the second embedded device, receiving the embedded device WAN IP address and access credential from the third mobile device; and
    at the second embedded device, transmitting a second embedded device WAN IP address and second access credential to the embedded device.

15. The method of claim 1, further comprising transmitting second digital information from the embedded device to at least one of the first and second mobile devices on a high priority basis via a second push notification.

16. An embedded device for sharing digital information between first and second mobile devices, the embedded device comprising:
- a processor; and
- a non-transitory computer-readable medium storing a sharing module and a push module the sharing module comprising instructions configured to cause the processor:
- to transmit to the first mobile device an invitation push notification inviting the first mobile device to share the digital information, wherein the first mobile device sends to the second mobile device an invitation to join a group and receives from the second mobile device an identifier of the second mobile device;
- to receive the identifier of the second mobile device from the first mobile device after the first mobile device receives the identifier of the second mobile device from the second mobile device;
- to enroll the second mobile device in the group based upon receiving the identifier of the second mobile device from the first mobile; and
- to receive the digital information from the first mobile device, wherein the embedded device receives the digital information transmitted from the first mobile device responsive to the invitation push notification;

the push module comprising instructions configured to cause the processor to notify the second mobile device of the digital information via a push notification.

17. The embedded device of claim 16, further comprising an IP address update module comprising instructions configured to cause the processor to maintain communication with the first and second mobile devices by notifying the first and second mobile devices of a new WAN IP address via respective additional push notifications.

18. The embedded device of claim 16, wherein the first and second mobile devices are configured to use a domain name to retrieve a new embedded device WAN IP address from a dynamic domain name system (DDNS) server.

19. The embedded device of claim 16, wherein the computer-readable medium further stores an enrollment module comprising instructions configured to cause the processor to receive an identifier of the second mobile device from the first mobile device.

20. The embedded device of claim 16, wherein the push module comprises instructions configured to cause the processor to notify the second mobile device of the digital information via the push notification by generating a message relating to the digital information and transmitting the message through a Global Push Notification Server or third-party push notification service.

21. The embedded device of claim 16, wherein the sharing module further comprises instructions configured to cause the processor to transmit the digital information to the second mobile device responsive to a request for the digital information by the second mobile device following the notification step.

22. The embedded device of claim 16, further comprising a storage device, the sharing module further comprising instructions configured to cause the processor to store the digital information in the storage device, wherein the sharing module comprises instructions configured to cause the processor to notify the second mobile device of the digital information at a predetermined period after storing the digital information in the storage device.

23. The embedded device of claim 16, wherein the computer-readable medium further stores a new application module comprising instructions configured to cause the processor to receive from the Internet or from one of the first and second mobile devices an embedded device component of an application.

24. The embedded device of claim 23, wherein the new application module comprises instructions configured to cause the processor to receive a push of the embedded device component of the application from the one of the first and second mobile devices.

25. The embedded device of claim 23, wherein the new application module comprises instructions configured to cause the processor to request the embedded device component from the one of the first and second mobile devices responsive to detection of a mobile device component of the application on the mobile device.

26. The embedded device of claim 16, wherein the embedded device is selected from the group consisting of: a gateway, a wireless gateway, a router, a wireless router, a media player, a wireless media player, an access point, a wireless access point, a network access storage (NAS) device, a thumb drive, and an embedded server.

27. The embedded device of claim 16, wherein the computer-readable medium further stores a merge module comprising instructions configured to cause the processor to transmit the digital information to a second embedded device,
- optionally wherein the merge module of the embedded device further comprises instructions configured to cause the processor to receive an identifier of a third mobile device from the first mobile device, to send a first embedded device wide area network (WAN) Internet protocol (IP) address and access credential to the third mobile device via a third push notification, and to receive a second embedded device WAN IP address and access credential from the second embedded device.

28. The embedded device of claim 16, wherein the push module comprises instructions configured to cause the processor to transmit second digital information to at least one of the first and second mobile devices on a high priority basis via a second push notification.

29. The method of claim 1, further comprising:
- at the embedded device, wherein the digital information comprises a location of the first mobile device, determining second digital information relates to the location of the first mobile device; and
- at the embedded device, transmitting the second digital information to the first mobile device.

30. The embedded device of claim 16, wherein the digital information comprises a location of the first mobile device, and wherein the sharing module comprising instructions configured to cause the processor to determine second digital information relates to the location of the first mobile device; and, wherein the push module comprises instructions configured to cause the processor to transmit the second digital information to the first mobile device.

* * * * *